United States Patent
Bouda

(10) Patent No.: US 7,970,281 B2
(45) Date of Patent: Jun. 28, 2011

(54) SYSTEM AND METHOD FOR MANAGING DIFFERENT TRANSMISSION ARCHITECTURES IN A PASSIVE OPTICAL NETWORK

(75) Inventor: Martin Bouda, Plano, TX (US)

(73) Assignee: Fujitsu Limited, Kawasaki (JP)

( * ) Notice: Subject to any disclaimer, the term of this patent is extended or adjusted under 35 U.S.C. 154(b) by 858 days.

(21) Appl. No.: 11/627,809

(22) Filed: Jan. 26, 2007

(65) Prior Publication Data

US 2008/0181613 A1 Jul. 31, 2008

(51) Int. Cl.
*H04J 14/08* (2006.01)
*H04J 3/16* (2006.01)

(52) U.S. Cl. ............... 398/99; 398/74; 398/75
(58) Field of Classification Search ............... 398/66–76
See application file for complete search history.

(56) References Cited

U.S. PATENT DOCUMENTS

| | | | | |
|---|---|---|---|---|
| 4,555,810 A * | 11/1985 | Khoe et al. | ....................... | 398/58 |
| 4,763,317 A * | 8/1988 | Lehman et al. | ....................... | 370/358 |
| 5,119,223 A * | 6/1992 | Panzer et al. | ....................... | 398/75 |
| 5,285,305 A * | 2/1994 | Cohen et al. | ....................... | 398/31 |
| 5,307,191 A * | 4/1994 | Audouin et al. | ....................... | 398/71 |
| 5,321,541 A * | 6/1994 | Cohen | ....................... | 398/82 |
| 5,355,368 A * | 10/1994 | Dore et al. | ....................... | 370/296 |
| 5,440,416 A * | 8/1995 | Cohen et al. | ....................... | 398/82 |
| 5,576,874 A * | 11/1996 | Czerwiec et al. | ....................... | 398/75 |
| 5,579,421 A * | 11/1996 | Duvall et al. | ....................... | 385/14 |
| 5,631,758 A * | 5/1997 | Knox et al. | ....................... | 398/75 |
| 5,694,234 A * | 12/1997 | Darcie et al. | ....................... | 398/72 |
| 5,790,287 A * | 8/1998 | Darcie et al. | ....................... | 398/108 |
| 5,793,507 A * | 8/1998 | Giles et al. | ....................... | 398/68 |
| 5,808,764 A * | 9/1998 | Frigo et al. | ....................... | 398/72 |
| 5,926,298 A * | 7/1999 | Li | ....................... | 385/24 |

(Continued)

FOREIGN PATENT DOCUMENTS

EP 1 028 331 A2 8/2000

(Continued)

OTHER PUBLICATIONS

Son et al., "Bidirectional WDM Passive Optical Network for Simultaneous Transmission of Data and Digital Broadcast Video Service," Journal of Lightwave Technology, vol. 21, No. 8, Aug. 2003, pp. 1723-1727.

(Continued)

*Primary Examiner* — Kenneth N. Vanderpuye
*Assistant Examiner* — Danny W Leung
(74) *Attorney, Agent, or Firm* — Baker Botts L.L.P.

(57) ABSTRACT

In accordance with the teachings of the present invention, a system and method for managing different transmission architectures in a passive optical network (PON) is provided. In a particular embodiment, a method for managing different transmission architectures in a PON includes transmitting traffic in an upstream or downstream direction in a first time-slot in a PON at each channel of a first set of one or more channels. The method also includes transmitting traffic in the same upstream or downstream direction in a second time-slot in the PON at each channel of a second set of one or more channels that provide greater bandwidth than the first set of one or more channels, wherein at least one channel of the first set at least partially overlaps at least one channel of the second set but is not identical to the at least one channel of the second set.

20 Claims, 4 Drawing Sheets

U.S. PATENT DOCUMENTS

| | | | | |
|---|---|---|---|---|
| 6,108,112 | A * | 8/2000 | Touma | 398/10 |
| 6,144,472 | A * | 11/2000 | Knox | 398/168 |
| 6,163,637 | A * | 12/2000 | Zirngibl | 385/37 |
| 6,388,782 | B1 * | 5/2002 | Stephens et al. | 398/79 |
| 6,411,410 | B1 * | 6/2002 | Wright et al. | 398/79 |
| 6,424,636 | B1 * | 7/2002 | Seazholtz et al. | 370/295 |
| 6,498,876 | B1 * | 12/2002 | Liu et al. | 385/34 |
| 6,515,786 | B1 * | 2/2003 | Xia et al. | 359/256 |
| 6,592,272 | B1 * | 7/2003 | Masucci et al. | 398/47 |
| 6,697,374 | B1 * | 2/2004 | Shraga et al. | 370/458 |
| 6,767,139 | B2 * | 7/2004 | Brun et al. | 385/84 |
| 6,775,478 | B2 * | 8/2004 | Suzuki et al. | 398/75 |
| 6,895,185 | B1 * | 5/2005 | Chung et al. | 398/72 |
| 7,016,608 | B1 * | 3/2006 | Ball et al. | 398/71 |
| 7,139,487 | B2 * | 11/2006 | Kozaki et al. | 398/100 |
| 7,203,422 | B2 * | 4/2007 | Kani et al. | 398/72 |
| 7,245,829 | B1 * | 7/2007 | Sindile | 398/45 |
| 7,330,655 | B2 * | 2/2008 | Kim et al. | 398/72 |
| 7,330,656 | B2 * | 2/2008 | Lee et al. | 398/78 |
| 7,362,931 | B2 * | 4/2008 | Gall et al. | 385/24 |
| 7,366,415 | B2 * | 4/2008 | Lee et al. | 398/66 |
| 7,382,982 | B2 * | 6/2008 | Lee et al. | 398/100 |
| 7,386,236 | B1 * | 6/2008 | Kuo et al. | 398/99 |
| 7,389,048 | B2 * | 6/2008 | Kani et al. | 398/72 |
| 7,412,169 | B2 * | 8/2008 | Joo et al. | 398/72 |
| 7,428,385 | B2 * | 9/2008 | Lee et al. | 398/100 |
| 7,428,586 | B2 * | 9/2008 | Sutherland et al. | 709/224 |
| 7,440,701 | B2 * | 10/2008 | Li et al. | 398/135 |
| 7,457,541 | B2 * | 11/2008 | Koh et al. | 398/72 |
| 7,483,633 | B2 * | 1/2009 | Ishimura | 398/75 |
| 7,499,471 | B2 * | 3/2009 | Lee et al. | 370/478 |
| 7,502,563 | B2 * | 3/2009 | Nozue et al. | 398/69 |
| 7,555,215 | B2 * | 6/2009 | Nakamura et al. | 398/72 |
| 7,558,477 | B2 * | 7/2009 | Chung et al. | 398/5 |
| 7,603,036 | B2 * | 10/2009 | Palacharla et al. | 398/72 |
| 7,684,703 | B2 | 3/2010 | Harada | 398/68 |
| 2002/0145775 | A1 * | 10/2002 | Effenberger et al. | 359/123 |
| 2002/0196491 | A1 * | 12/2002 | Deng et al. | 359/124 |
| 2003/0002102 | A1 * | 1/2003 | Khalfallah et al. | 359/124 |
| 2003/0007212 | A1 * | 1/2003 | Sala et al. | 359/136 |
| 2003/0007724 | A1 * | 1/2003 | Gummalla et al. | 385/24 |
| 2003/0142692 | A1 * | 7/2003 | Shimada | 370/442 |
| 2003/0177215 | A1 * | 9/2003 | Sutherland et al. | 709/223 |
| 2003/0177216 | A1 * | 9/2003 | Sutherland et al. | 709/223 |
| 2004/0001718 | A1 * | 1/2004 | Matthews et al. | 398/98 |
| 2004/0008989 | A1 * | 1/2004 | Hung | 398/69 |
| 2004/0052274 | A1 * | 3/2004 | Wang et al. | 370/468 |
| 2004/0052528 | A1 * | 3/2004 | Halgren et al. | 398/75 |
| 2004/0131357 | A1 | 7/2004 | Farmer et al. | |
| 2004/0141748 | A1 * | 7/2004 | Spickermann et al. | 398/72 |
| 2004/0184806 | A1 * | 9/2004 | Lee et al. | 398/79 |
| 2004/0208537 | A1 * | 10/2004 | Lee et al. | 398/41 |
| 2005/0053376 | A1 * | 3/2005 | Joo et al. | 398/72 |
| 2005/0069317 | A1 * | 3/2005 | Lee et al. | 398/67 |
| 2005/0129404 | A1 * | 6/2005 | Kim et al. | 398/84 |
| 2005/0152697 | A1 * | 7/2005 | Lee et al. | 398/75 |
| 2005/0157976 | A1 * | 7/2005 | Furukawa et al. | 385/24 |
| 2005/0158048 | A1 | 7/2005 | Sung et al. | 398/66 |
| 2005/0169302 | A1 * | 8/2005 | Lee et al. | 370/465 |
| 2005/0175343 | A1 * | 8/2005 | Huang et al. | 398/66 |
| 2005/0175344 | A1 * | 8/2005 | Huang et al. | 398/79 |
| 2005/0180689 | A1 | 8/2005 | Kozhevnikov et al. | |
| 2006/0002706 | A1 * | 1/2006 | Lee et al. | 398/71 |
| 2006/0039357 | A1 * | 2/2006 | Kim et al. | 370/352 |
| 2006/0056849 | A1 * | 3/2006 | Pamart et al. | 398/79 |
| 2006/0067692 | A1 | 3/2006 | Park et al. | 398/75 |
| 2006/0115271 | A1 * | 6/2006 | Hwang et al. | 398/72 |
| 2006/0127093 | A1 * | 6/2006 | Park et al. | 398/75 |
| 2006/0152567 | A1 * | 7/2006 | Fujioka et al. | 347/104 |
| 2006/0153565 | A1 * | 7/2006 | Park et al. | 398/71 |
| 2006/0153567 | A1 | 7/2006 | Kim et al. | |
| 2006/0222365 | A1 * | 10/2006 | Jung et al. | 398/72 |
| 2007/0019957 | A1 * | 1/2007 | Kim et al. | 398/72 |
| 2007/0058973 | A1 * | 3/2007 | Tanaka | 398/1 |
| 2007/0092249 | A1 | 4/2007 | Akasaka et al. | |
| 2007/0092250 | A1 | 4/2007 | Bouda et al. | |
| 2007/0092251 | A1 | 4/2007 | Bouda et al. | |
| 2007/0092252 | A1 | 4/2007 | Bouda et al. | |
| 2007/0092253 | A1 | 4/2007 | Bouda | |
| 2007/0092254 | A1 * | 4/2007 | Bouda | 398/72 |
| 2007/0092255 | A1 | 4/2007 | Bouda | |
| 2007/0092256 | A1 * | 4/2007 | Nozue et al. | 398/72 |
| 2007/0104487 | A1 * | 5/2007 | Xiong et al. | 398/75 |
| 2007/0116467 | A1 * | 5/2007 | Kwon et al. | 398/72 |
| 2007/0147834 | A1 * | 6/2007 | Lai et al. | 398/69 |
| 2007/0166037 | A1 * | 7/2007 | Palacharla et al. | 398/72 |
| 2007/0166043 | A1 | 7/2007 | Bouda | |
| 2007/0183779 | A1 * | 8/2007 | Bouda et al. | 398/72 |
| 2007/0189773 | A1 * | 8/2007 | Jung et al. | 398/72 |
| 2007/0280690 | A1 * | 12/2007 | Bouda et al. | 398/68 |
| 2007/0280691 | A1 * | 12/2007 | Bouda | 398/71 |
| 2008/0031621 | A1 * | 2/2008 | Kuo et al. | 398/26 |
| 2008/0181613 | A1 * | 7/2008 | Bouda | 398/98 |
| 2008/0273877 | A1 * | 11/2008 | Palacharla et al. | 398/64 |
| 2008/0310841 | A1 * | 12/2008 | Lee et al. | 398/63 |
| 2008/0310843 | A1 * | 12/2008 | Gadkari et al. | 398/72 |
| 2009/0123148 | A1 * | 5/2009 | Park et al. | 398/17 |

FOREIGN PATENT DOCUMENTS

| | | |
|---|---|---|
| EP | 1 130 806 A2 | 9/2001 |
| EP | 1 434 375 A2 | 6/2004 |
| WO | WO 2007/047559 | 4/2007 |
| WO | WO 2007/081748 | 7/2007 |

OTHER PUBLICATIONS

Ching et al., "Passive Optical Networks," Sharing the Fiber, Telecom Equipment-Wireline, Merrill Lynch, May 15, 2001, pp. 1-27.

Kuhlow et al., "AWG-Based Device for a WDM Overlay PON in the 1.5-μm Bank," IEEE Photonics Technology Letters, vol. 11, No. 2, Feb. 1999, pp. 218-220.

Feldman et al., "An Evaluation of Architectures Incorporating Wavelength Division Multiplexing for Broad-Bank Fiber Access," Journal of Lightwave Technology, vol. 16, No. 9, Invited Paper, Sep. 1998, pp. 1546-1559.

Giles et al., "Access PON Using Downstream 1550-nm WDM Routing and Upstream 1300-nm SCMA Combining Through a Fiber-Grating Route," IEEE Photonics Technology Letters, vol. 8, No. 11, Nov. 1996, pp. 1549-1551.

Hilbk et al., "High Capacity WDM Overlay on a Passive Optical Network," Electronic Letters, Nov. 7, 1996, vol. 32, No. 23, pp. 2162-2163.

Inoue et al., "Silica-based Arrayed-Waveguide Grating Circuit as Optical Splitter/Router," Electronic Letters, Apr. 27, 1995, vol. 31, No. 9, pp. 726-727.

Kashima, "Upgrade of Passive Optical Subscriber Network," Journal of Lightwave Technology, vol. 9, No. 1, Jan. 1991, pp. 113-120.

Lin, "Passive Optical Subscriber Loops with Multiaccess," Journal of Lightwave Technology, vol. 7, No. 11, Nov. 1989, pp. 1769-1777.

MOOG Component Group, "(Mems)* Singlemode Fiber Optic Switch," FO5935, 2 pages, 2005.

Light Reading—Networking the Telecom Industry, PON & FTTx Update, Introduction, Aug. 8, 2005, *Light Reading*, Aug. 8, 2005, printed from web site Jan. 26, 2006, pp. 1-11, Retrieved from website Aug. 8, 2005.

ITU-T Telecommunication Standardization Sector of ITU-T, G.984.1, "Gigabit-Capable Passive Optical Network (GPON): General Characteristics," Series G: Transmission Systems and Media, Digital Systems and Networks, Digital Sections and Digital Line System—Optical Line Systems for Local and Access Networks, Mar. 2003, 20 pages.

ITU-T Telecommunication Standardization Sector of ITU-T, G.983.1, "Broadband Optical Access Systems Based on Passive Optical Networks (PON)," Series G: Transmission Systems and Media, Digital Systems and Networks, Digital Sections and Digital Line System—Optical Line Systems for Local and Access Networks, 124 pages, Jan. 2005, 123 pages.

ITU-T Telecommunication Standardization Sector of ITU-T, G.983.3, "A Broadband Optical Access System with Increased Service Capability by Wavelength Allocation," Series G: Transmission Systems and Media, Digital Systems and Networks, Digital Sections and Digital Line System—Optical Line Systems for Local and Access Networks, Mar. 2001, 59 pages.

ITU-T Telecommunication Standardization Sector of ITU-T, G.984.3, "Gigabit-Capable Passive Optical Network (G-PON): Transmission Convergence Layer Specification," Series G: Transmission Systems and Media, Digital Systems and Networks, Digital Sections and Digital Line System—Optical Line Systems for Local and Access Networks, Feb. 2004, 116 pages.

ITU-T Telecommunication Standardization Sector of ITU-T, G.984.3, Series G: Study Period 2005-2008, Updated Revised Amendment 1, : "Amendment to Gigabit-Capable Passive Optical Network (G-PON): Transmission Convergence Layer Specification (2004)," pp. 1-39, May 16-27, 2005.

Green, Paul E. Jr., Telecommunications Consultant, "Fiber-to-the-Home White Paper,", Feb. 21, 2003, pp. 1-21.

Park et al.; "Bidirectional Wavelength-Division-Multiplexing Self-Healing Passive Optical Network," Network Research Team, Telecommunications R&D Center, Samsung Electronics; 2005 Optical Society of America, 3 pages, Mar. 6, 2005.

Son et al.; "Survivable Network Architectures for WDM PON;" Korea Advanced Institute of Science and Technology; 2005 Optical Society of America, 3 Pages, Mar. 6, 2005.

Smith, Stephen, "Business Class Services Over a GPON Network," Fujitsu Network Communications; 10 pages, Mar. 5, 2006.

Wang et al.; "A Novel Centrally Controlled Protection Scheme for Traffic Restoration in WDM Passive Optical Networks;" IEEE Photonics Technology Letters, vol. 17, No. 3; Mar. 2005, pp. 717-719.

Suzuki et al.; "A Reliable Wide-Area WDM-PON Using Wavelength-Shifted Protection Scheme;" Access Network Service Systems Laboratories, NTT Corporation; 2 pages, Sep. 25, 2005.

ITU—Telecommunication Standardization Sector Study Group 15; "Recommendation G.983.5: A Broadband Optical Access System with Enhanced Survivability (for consent);" Editor, Recommendation G.983.5; 45 pages, Oct. 15-26, 2001.

Phillips et al.; "Redundancy Strategies for a High Splitting Optically Amplified Passive Optical Network," Journal of Lightwave Technology, vol. 19, No. 2; pp. 137-149, Feb. 2001.

Chan et al.; "A Novel Bidirectional Wavelength Division Multiplexed Passive Optical Network with 1:1 Protection;" Friday Morning, OFC, vol. 2; pp. 779-781, 2003.

Sun et al.; "A Novel Star-Ring Protection Architecture Scheme for WDM Passive Optical Access Networks;" Department of Information Engineering, The Chinese University of Hong Kong; 3 pages, Mar. 6, 2005.

Hirth, Ryan, "1 Gbps to 10 Gbps Migration," Teknovus, Access the Future, IEEE Meeting, Jul. 2006, San Diego, CA, pp. 1-7.

Diouf, Leopold, "Next Generation Access (NGA)," An Alcatel-Lucent Contribution to NGA, FSAN Meeting, Munich, Germany, Feb. 7-9, 2007, pp. 1-30, published on FSAN website Jan. 31, 2007.

Handley et al., "A Comparison of WDM PON Architectures," Proceedings of the European Conference on Network and Optical Communications, Broadband Access and Technology. Amsterdam, IOS Press, NL, vol. part 1, pp. 141-147, Jan. 1, 1999.

International Searching Authority, "Notification of Transmittal of the International Search Report and the Written Opinion of the International Searching Authority, or the Declaration," (PCT Rule 44.1), International Application No. PCT/US2006/040318, mailed Feb. 14, 2007, 13 pages.

International Searching Authority, "Notification of Transmittal of the International Search Report and the Written Opinion of the International Searching Authority, or the Declaration," (PCT Rule 44.1), International Application No. PCT/US2006/040330, mailed Feb. 19, 2007, 13 pages.

International Searching Authority, "Notification of Transmittal of the International Search Report and the Written Opinion of the International Searching Authority, or the Declaration," (PCT Rule 44.1), International Application No. PCT/US2006/040605, 14 pages, mailed Feb. 14, 2007, 14 pages.

Bouda, "A Hybrid Passive Optical Network Using Shared Wavelengths," filed Feb. 3, 2006, 64 pps., 9 pps. drawings, U.S. Appl. No. 11/347,434.

Bouda, "A Distribution Node for a Wavelength-Sharing Network," filed Feb. 3, 2006, 64 pps., 9 pps. drawings, U.S. Appl. No. 11/347,612.

Bouda et al., "Distribution Components for a Wavelength-Sharing Network," filed Feb. 3, 2006, 69 pps., 9 pps. drawings, U.S. Appl. No. 11/347,585.

Bouda et al., "Upgradeable Passive Optical Network," filed Feb. 3, 2006, 66 pps, 9 pps. drawings, U.S. Appl. No. 11/347,446.

Palacharla et al., "System and Method for Managing Network Components in a Hybrid Passive Optical Network," filed Oct. 25, 2006, 43 pps, 4 drawings U.S. Appl. No. 11/552,696.

Bouda, "System and Method for Transmitting Traffic in a Plurality of Passive Optical Networks," U.S. Appl. No. 11/627,809, filed Jan. 26, 2007, 35 pps., 5 pps. drawings.

Bouda, "System and Method for Transmitting Upstream Traffic in an Optical Network," U.S. Appl. No. 11/426,875, filed Jun. 27, 2006, 49 pps., 5 pps. drawings.

Bouda, "System and Method for Distributing Traffic in an Optical Network," U.S. Appl. No. 11/426,879, filed Jun. 27, 2006, 43 pps., 5 pps. drawings.

Akasaka et al., "System and Method for Traffic Distribution in an Optical Network," U.S. Appl. No. 11/426,884, filed Jun. 27, 2006, 71 pps., 12 pps. drawings.

Bouda et al., "Method and System for Increasing Downstream Bandwidth in an Optical Network," filed Jan. 5, 2007, 42 pps., 10 pps. drawings, U.S. Appl. No. 11/620,144.

Bouda, "Distribution Node for an Optical Network," filed Jan. 4, 2007, 38 pps., 6 pps. drawings, U.S. Appl. No. 11/619,945.

Akasaka et al., "System and Method for Protecting an Optical Network," filed Dec. 11, 2006, 42 pps., 4 pps. drawings, U.S. Appl. No. 11/609,120.

Bouda et al., "System and Method for Extending Reach in a Passive Optical Network," filed Jan. 31, 2007, 51 pps, 5 pps. drawings, U.S. Appl. No. 11/669,657.

Bouda, "System and Method for Transmitting Optical Markers in a Passive Optical Network System," 52 pps., 5 pps. drawings, filed Jan. 31, 2007, U.S. Appl. No. 11/669,667.

International Searching Authority, "Notification of Transmittal of the International Search Report and the Written Opinion of the International Searching Authority, or the Declaration," (PCT Rule 44.1), International Application No. PCT/US2006/042224, mailed Mar. 5, 2007, 13 pages.

International Searching Authority, "Notification of Transmittal of the International Search Report and the Written Opinion of the International Searching Authority, or the Declaration," (PCT Rule 44.1), International Application No. PCT/US2006/040597, mailed Mar. 5, 2007, 15 pages.

International Searching Authority, "Notification of Transmittal of the International Search Report and the Written Opinion of the International Searching Authority, or the Declaration," (PCT Rule 44.1), International Application No. PCT/US2006/042220, mailed Mar. 12, 2007, 12 pages.

Zang et al., "A Review of Routing and Wavelength Assignment Approaches for Wavelength-Routed Optical WDM Networks," Optical Networks Magazine, SPIE, Bellingham, WA, US, vol. 1, No. 1, Jan. 2000, pp. 47-60.

Bouda, "System and Method for Protecting an Optical Network," U.S. Appl. No. 11/680,186, filed Feb. 28, 2007, 35 pps., 6 pps. drawings.

International Searching Authority, "Notification of Transmittal of the International Search Report and the Written Opinion of the International Searching Authority, or the Declaration," (PCT Rule 44.1), International Application No. PCT/US2006/043188, mailed Mar. 14, 2007, 12 pages.

Langer et al, "Promising Evolution Paths for Passive Optical Access Networks," Proceedings of 2004 6th International Conference on Warsaw, Poland, Jul. 4, 2004 through Jul. 7, 2004, IEEE, vol. 1, pp. 202-207.

International Searching Authority, "Notification of Transmittal of the International Search Report and the Written Opinion of the International Searching Authority, or the Declaration," (PCT Rule 44.1), International Application No. PCT/US2007/002955, mailed Jun. 28, 2007, 11 pages.

Wagner et al., "Technology and System Issues for a WDM-Based Fiber Loop Architecture," Journal of Lightwave Technology, IEEE Service Center, New York, NY, vol. 7, No. 11, Nov. 1, 1989, pp. 1759-1768.

Frigo et al., "A Wavelength-Division Multiplexed Passive Optical Network with Cost-Shared Components," IEEE Photonics Technology Letters, IEEE Service Center, Piscataway, NJ, vol. 4, No. 11, Nov. 1, 1994, pp. 1365-1367.

Oakley, "An Economic Way to See in the Broadband Dawn," Institute of Electrical and Electronics Engineers, Communications for the Information Age, Proceedings of the Global Telecommunications Conference and Exhibition (Globecom), New York, IEEE, vol. 3, Nov. 28, 1988, pp. 1574-1578.

International Searching Authority, "Notification of Transmittal of the International Search Report and the Written Opinion of the International Searching Authority, or the Declaration," (PCT Rule 44.1), International Application No. PCT/US2007/002851, mailed Aug. 21, 2007, 11 pages.

European Patent Office, European Search Report and Office Action, Application No. 07010686-9-2415, mailed Aug. 21, 2007, 14 pages.

Son et al., "Bidirectional Passive Optical Network for the Transmission of WDM Channels with Digital Broadcast Video Signals," Optical Society of America/Institute of Electrical and Electronics Engineers, Optical Fiber Communication Conference and Exhibit (OFC). Technical Digest, Post Conference Digest, Mar. 17-22, 2002, Trends in Optical and Photonic Series, pp. 767-768.

International Searching Authority, "Notification of Transmittal of the International Search Report and the Written Opinion of the International Searching Authority, or the Declaration," (PCT Rule 44.1), International Application No. PCT/US2007/000184, mailed Jul. 27, 2007, 13 pages.

Asatani et al., "A Field Trial of Fiber Optic Subscriber Loop Systems Utilizing Wavelength-Division Multiplexers," IEEE Transactions on Communications, IEEE Service Center, Piscataway, NJ, vol. COM-30, No. 9, Sep. 1982, pp. 2172-2184.

Cheng et al., "Integrated a Hybrid CATV/GPON Transport System Based on 1.31/1.49/1.55um WDM Transceiver Module," 2005 Quantum Electronics and Laser Science Conference, pp. 1678-1680, 2005.

Palacharla et al.., System and Method for Managing Communication in a Hybrid Passive Optical Network, filed May 2, 2007, U.S. Appl. No. 11/743,311, 50 pages, 6 pages of drawings.

International Searching Authority, "Notification of Transmittal of the International Search Report and the Written Opinion of the International Searching Authority, or the Declaration," (PCT Rule 44.1), International Application No. PCT/US2007/000189, mailed Jul. 18, 2007, 12 pages.

* cited by examiner

SYSTEM AND METHOD FOR MANAGING DIFFERENT TRANSMISSION ARCHITECTURES IN A PASSIVE OPTICAL NETWORK

TECHNICAL FIELD

The present invention relates generally to communication systems and, more particularly, to a system and method for managing different transmission architectures in a passive optical network.

BACKGROUND

In recent years, a bottlenecking of communication networks has occurred in the portion of the network known as the access network. Bandwidth on longhaul optical networks has increased sharply through new technologies such as wavelength division multiplexing (WDM) and transmission of traffic at greater bit rates. Metropolitan-area networks have also seen a dramatic increase in bandwidth. However, the access network, also known as the last mile of the communications infrastructure connecting a carrier's central office to a residential or commercial customer site, has not seen as great of an increase in affordable bandwidth. The access network thus presently acts as the bottleneck of communication networks, such as the internet.

Power-splitting passive optical networks (PSPONs) offer one solution to the bottleneck issue. PSPONs refer to typical access networks in which an optical line terminal (OLT) at the carrier's central office transmits traffic over one or two downstream wavelengths for broadcast to optical network units (ONUs). In the upstream direction, ONUs typically time-share transmission of traffic in one wavelength. An ONU refers to a form of access node that converts optical signals transmitted via fiber to electrical signals that can be transmitted to individual subscribers and vice versa. PSPONs address the bottleneck issue by providing greater bandwidth at the access network than typical access networks. For example, networks such as digital subscriber line (DSL) networks that transmit traffic over copper telephone wires typically transmit at a rate between approximately 144 kilobits per second (Kb/s) and 1.5 megabits per second (Mb/s). Conversely, Broadband PONs (BPONs), which are example PSPONs, are currently being deployed to provide hundreds of megabits per second capacity shared by thirty-two users. Gigabit PONs (GPONs), another example of a PSPON, typically operate at speeds of up to 2.5 gigabits per second (Gb/s) by using more powerful transmitters, providing even greater bandwidth. Other PSPONs include, for example, asynchronous transfer mode PONs (APONs) and gigabit Ethernet PONs (GEPONs).

Although PSPON systems provide increased bandwidth in access networks, demand continues to grow for higher bandwidth. One solution, wavelength division multiplexing PON (WDMPON), would increase downstream (and upstream) capacity dramatically but inefficiently. WDMPONs refer to access networks in which each ONU receives and transmits traffic over a dedicated downstream and upstream wavelength, respectively. Although WDMPONs would increase capacity dramatically, they would do so at a prohibitively high cost for many operators and would supply capacity far exceeding current or near-future demand.

Another solution, a hybrid PON (HPON) between a PSPON and a WDMPON, would also increase downstream capacity. An HPON generally refers to any suitable PON that is not a full WDMPON but that either transmits downstream traffic in a plurality of wavelengths each shared by a group of wavelength-sharing ONUs or that transmits downstream traffic in a unique wavelength for each ONU. An HPON may be an economical upgrade for some network operators from a PSPON. In some cases, network operators may upgrade their HPONs to WDMPONs when there is sufficient bandwidth demand.

One challenge when upgrading capacity in a PON arises when some ONU users desire an upgrade in upstream or downstream capacity and others do not. In some of these situations, the upgrade in capacity may require a transmission architecture that is different and conflicting with the existing transmission architecture. In such cases, network operators may desire an upgrade solution that meets the interests of both types of users.

SUMMARY

In accordance with the teachings of the present invention, a system and method for managing different transmission architectures in a passive optical network (PON) is provided. In a particular embodiment, a method for managing different transmission architectures in a PON includes transmitting traffic in an upstream or downstream direction in a first time-slot in a PON at each channel of a first set of one or more channels. The method also includes transmitting traffic in the same upstream or downstream direction in a second time-slot in the PON at each channel of a second set of one or more channels that provide greater bandwidth than the first set of one or more channels, wherein at least one channel of the first set at least partially overlaps at least one channel of the second set but is not identical to the at least one channel of the second set.

Technical advantages of one or more embodiments of the present invention may include providing flexibility when upgrading capacity in a passive optical network. In particular embodiments, network operators may, for example, upgrade upstream capacity for some ONUs and maintain existing upstream capacity for other ONUs, even when the upgraded upstream transmission architecture is conflicting with the existing upstream transmission architecture. The upstream transmission architectures may be conflicting, for example, where the two transmission architectures use the same or overlapping upstream wavelength bands or channels. In other embodiments, network operators may upgrade downstream capacity for some ONUs and maintain existing downstream capacity for other ONUs, even when the upgraded downstream transmission architecture is conflicting with the existing downstream transmission architecture.

Another technical advantage of particular embodiments may include supporting two or more transmission architectures in a cost-efficient manner. For example, few and relatively inexpensive components may be used in particular embodiments to allow multiple transmission architectures to be managed in a single passive optical network. In particular embodiments, the multiple transmission architectures may include a legacy transmission architecture and an upgraded transmission architecture. In alternative embodiments, multiple transmission architectures may be installed at the same time.

By providing flexibility when upgrading capacity in a passive optical network, particular embodiments of the present invention allow network operators to more closely meet demand for greater bandwidth. For many network operators, closely meeting demand for greater bandwidth provides for an efficient upgrade path. That few and relatively inexpensive components may be used to support the transmission architectures also increases the attractiveness of particular embodiments. In addition, network operators may benefit from increased user satisfaction by allowing some users to upgrade to higher capacity while allowing other users to maintain existing capacity.

It will be understood that the various embodiments of the present invention may include some, all, or none of the enumerated technical advantages. In addition other technical advantages of the present invention may be readily apparent to one skilled in the art from the figures, description, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Figure 1:
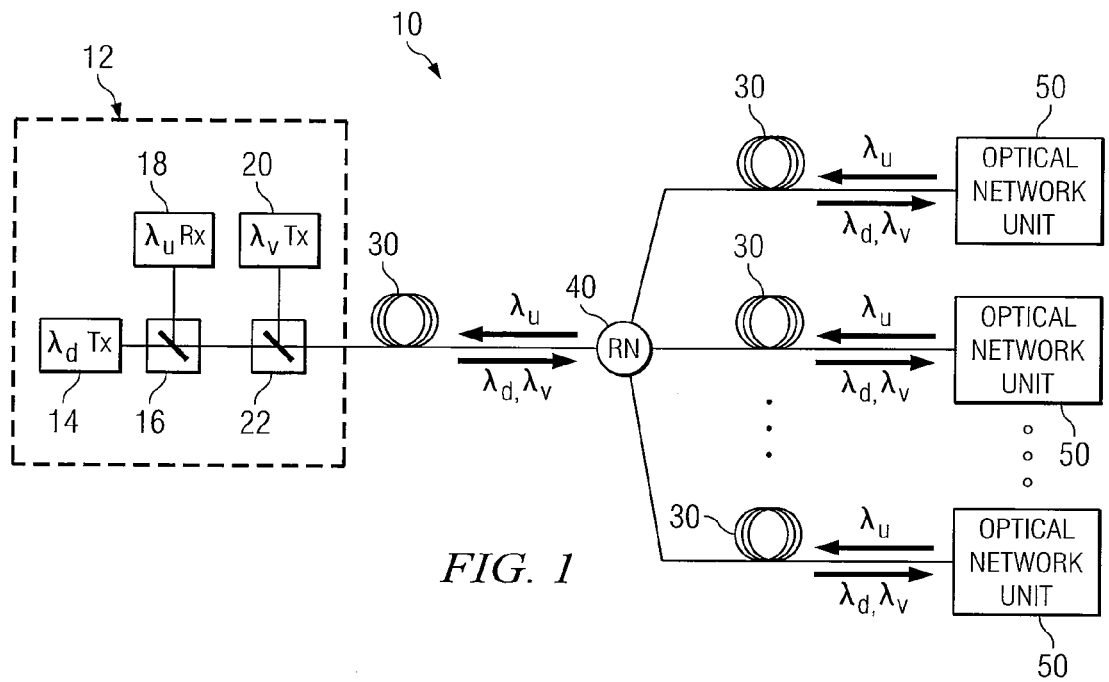
FIG. 1 is a diagram illustrating an example PSPON.

FIG. 1 is a diagram illustrating an example Power Splitting Passive Optical Network (PSPON) 10. Typically, PSPONs have been employed to address the bottlenecking of communications networks in the portion of the network known as the access network. In recent years, bandwidth on longhaul optical networks has increased sharply through new technologies such as wavelength division multiplexing (WDM) and transmission of traffic at greater bit rates. In addition, metropolitan-area networks have also seen a dramatic increase in bandwidth. However, the access network, also known as the last mile of the communications infrastructure connecting a carrier's central office to a residential or commercial customer site, has not seen as great of an increase in affordable bandwidth. The access network thus presently acts as the bottleneck of communication networks, such as the internet.

PSPONs address the bottleneck issue by providing greater bandwidth at the access network than typical access networks. For example, networks such as digital subscriber line (DSL) networks that transmit traffic over copper telephone wires typically transmit at a rate between approximately 144 kilobits per second (Kb/s) and 1.5 megabits per second (Mb/s). Conversely, broadband PONs (BPONs) are currently being deployed to provide hundreds of megabits per second capacity shared by thirty-two users. Gigabit PONs (GPONs), which typically operate at speeds of up to 2.5 gigabits per second (Gb/s) by using more powerful transmitters, provide even greater bandwidth.

Referring back to PSPON 10 of FIG. 1, PSPON 10 includes an Optical Line Terminal (OLT) 12, optical fiber 30, a Remote Node (RN) 40, and Optical Network Units (ONUs) 50. PSPON 10 refers to typical access networks in which an optical line terminal (OLT) at the carrier's central office transmits traffic over one or two downstream wavelengths for broadcast to optical network units (ONUs). PSPON 10 may be an asynchronous transfer mode PON (APON), a BPON, a GPON, a gigabit Ethernet PON (GEPON), or any other suitable PSPON. A feature common to all PSPONs 10 is that the outside fiber plant is completely passive. Downstream signals transmitted by the OLT are passively distributed by the RN to downstream ONUs coupled to the RN through branches of fiber, where each ONU is coupled to the end of a particular branch. Upstream signals transmitted by the ONUs are also passively forwarded to the OLT by the RN.

OLT 12, which may be an example of an upstream terminal, may reside at the carrier's central office, where it may be coupled to a larger communication network. OLT 12 includes a transmitter 14 operable to transmit traffic in a downstream wavelength, such as $\lambda_d$, for broadcast to all ONUs 50, which may reside at or near customer sites. OLT 12 may also include a transmitter 20 operable to transmit traffic in a second downstream wavelength $\lambda_v$ (which may be added to $\lambda_d$) for broadcast to all ONUs 50. As an example, in typical GPONs, $\lambda_v$ may carry analog video traffic. Alternatively, $\lambda_v$ may carry digital data traffic. OLT 12 also includes a receiver 18 operable to receive traffic from all ONUs 50 in a time-shared upstream wavelength, $\lambda_u$. OLT 12 may also comprise filters 16 and 22 to pass and reflect wavelengths appropriately.

It should be noted that, in typical PSPONs, downstream traffic in $\lambda_d$ and $\lambda_v$ is transmitted at a greater bit rate than is traffic in $\lambda_u$, as PSPONs typically provide lower upstream bandwidth than downstream bandwidth. It should also be noted that "downstream" traffic refers to traffic traveling in the direction from the OLT (or upstream terminal) to the ONUs (or downstream terminals), and "upstream" traffic refers to traffic traveling in the direction from the ONUs (or downstream terminals) to the OLT (or upstream terminal). It should further be noted that $\lambda_d$ may include the band centered around 1490 nm, $\lambda_v$ may include the band centered around 1550 nm, and $\lambda_u$ may include the band centered around 1310 nm in particular PSPONs.

Optical fiber 30 may include any suitable fiber to carry upstream and downstream traffic. In certain PSPONs 10, optical fiber 30 may comprise, for example, bidirectional optical fiber. In other PSPONs 10, optical fiber 30 may comprise two distinct fibers.

RN 40 of PSPON 10 (which may also generally be referred to as a distribution node) comprises any suitable power splitter, such as an optical coupler, and connects OLT 12 to ONUs 50. RN 40 is located in any suitable location and is operable to split a downstream signal such that each ONU 50 receives a copy of the downstream signal. Due to the split and other possible power losses, each copy forwarded to an ONU has less than 1/N of the power of the downstream signal received by RN 40, where N refers to the number of ONUs 50. In addition to splitting downstream signals, RN 40 is also operable to combine into one signal upstream, time-shared signals transmitted by ONUs 50. RN 40 is operable to forward the upstream signal to OLT 12.

ONUs 50 (which may be examples of downstream terminals) may include any suitable optical network unit or optical network terminal (ONT) and generally refer to a form of access node that converts optical signals transmitted via fiber to electrical signals that can be transmitted to individual subscribers and vice versa. Subscribers may include residential and/or commercial customers. Typically, PONs 10 have thirty-two ONUs 50 per OLT 12, and thus, many example PONs may be described as including this number of ONUs. However, any suitable number of ONUs per OLT may be provided. ONUs 50 may include triplexers that comprise two receivers to receive downstream traffic (one for traffic in $\lambda_d$ and the other for traffic in $\lambda_v$) and one transmitter to transmit upstream traffic in $\lambda_u$. The transmission rate of the ONU transmitter is typically less than the transmission rate of the OLT transmitter (due to less demand for upstream capacity than for downstream capacity). Each ONU 50 is operable to process its designated downstream traffic and to transmit upstream traffic according to an appropriate time-sharing protocol (such that the traffic transmitted by one ONU in $\lambda_u$ does not collide with the traffic of other ONUs in $\lambda_u$).

In operation, transmitter 14 of OLT 12 transmits downstream traffic for broadcast to ONUs 50 in $\lambda_d$. Transmitter 20 of OLT 12 may also transmit downstream analog video traffic for broadcast to ONUs 50 in $\lambda_v$. Traffic in $\lambda_d$ passes filter 16 and is combined with $\lambda_v$ at filter 22 (which passes $\lambda_d$ and reflects $\lambda_v$). The combined traffic then travels over optical fiber 30 to RN 40. RN 40 splits the downstream traffic into a suitable number of copies and forwards each copy to a corresponding ONU 50. Each ONU 50 receives a copy of the downstream traffic in $\lambda_d$ and $\lambda_v$ and processes the signal. Suitable addressing schemes may be used to identify which traffic is destined for which ONU 50.

In the upstream direction, each ONU 50 may transmit upstream traffic in $\lambda_u$ along fiber 30 according to a suitable time-sharing protocol (such that upstream traffic does not collide). RN 40 receives the upstream traffic from each ONU 50 and combines the traffic from each ONU 50 into one signal (at, e.g., the RN's power splitter). RN 40 then forwards the combined traffic over fiber 30 to OLT 12. At OLT 12, the combined traffic is passed by filter 22 and reflected by filter 16 to receiver 18. Receiver 18 receives the signal and processes it.

Figure 2:
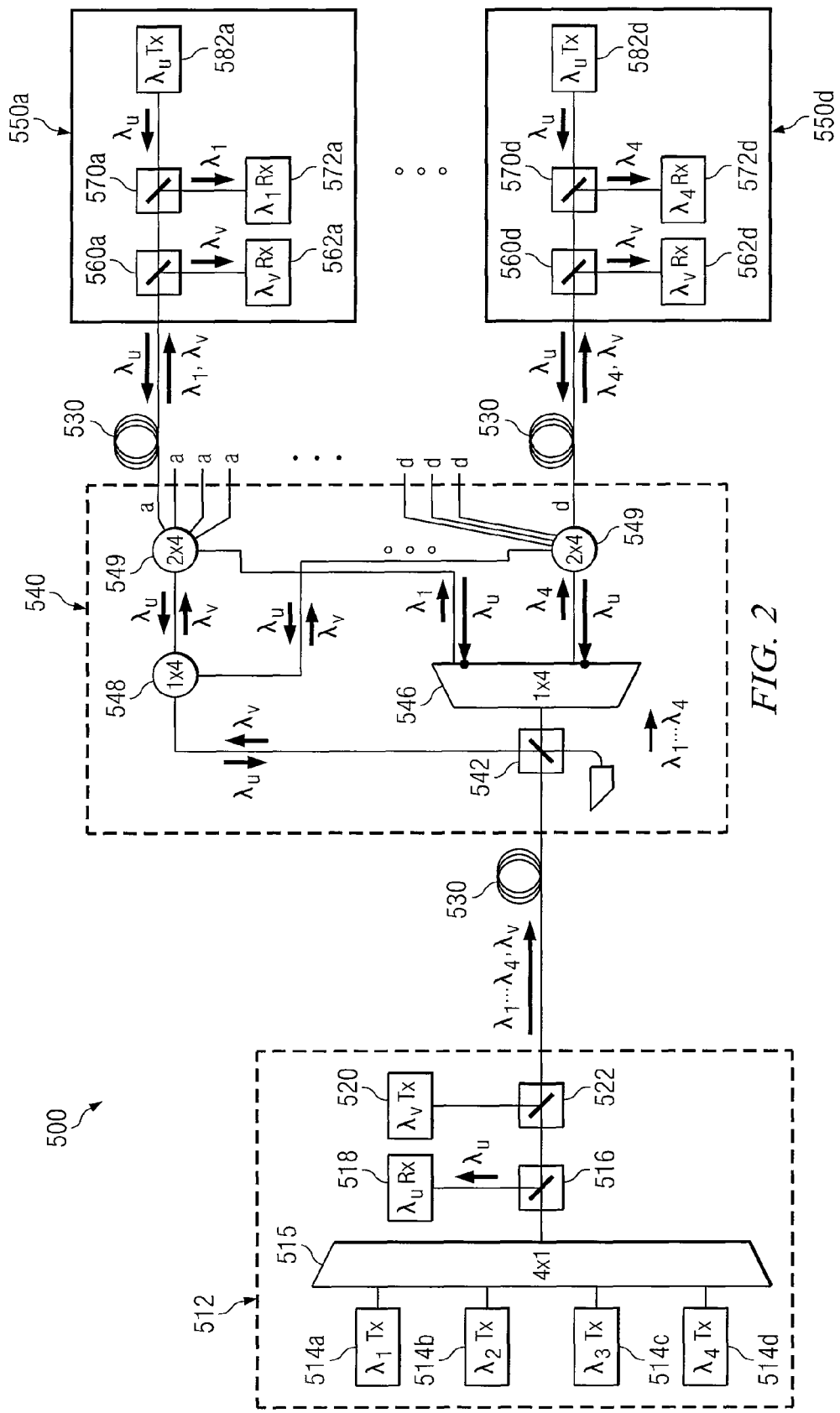
FIG. 2 is a diagram illustrating an example HPON.

FIG. 2 is a diagram illustrating an example HPON 500. Example HPON 500 comprises OLT 512, optical fiber 530, RN 540, and ONUs 550 and is a hybrid between a PSPON and a WDMPON. Example HPON 500 provides greater downstream capacity than a PSPON by having groups of two or more ONUs 550 share downstream WDM wavelengths. It should be noted that an HPON generally refers to any suitable PON that is not a full WDMPON but that is operable to route downstream traffic in particular wavelengths to particular ONUs (and to transmit upstream traffic in any suitable manner). An HPON may include both an HPON that transmits downstream traffic in a plurality of wavelengths each shared by a group of wavelength-sharing ONUs (a WS-HPON, as is illustrated) and an HPON that transmits downstream traffic in a unique wavelength for each ONU (retaining PSPON characteristics in the upstream direction).

OLT 512 (which may be an example of an upstream terminal) may reside at the carrier's central office and comprises transmitters 514, multiplexer 515, filter 516 and receiver 518, and transmitter 520 and filter 522. Each transmitter 514a-514d may comprise any suitable transmitter and is operable to transmit traffic over a corresponding wavelength, $\lambda_1$-$\lambda_4$, respectively. It should be noted that although example HPON 500 does not provide WDM for upstream traffic, it may be economical to implement transceivers (transmitter and receiver) in OLT 512, instead of only transmitters 514, in anticipation of a further upgrade to WDM upstream. It should further be noted that although four transmitters are illustrated in example HPON 500, any suitable number of transmitters (or transceivers) may be included, transmitting traffic at any suitable number of wavelengths.

Multiplexer 515 comprises any suitable multiplexer/demultiplexer (and may be considered a wavelength router) and is operable to combine the traffic in $\lambda_1$-$\lambda_4$ into one signal. In particular example networks, multiplexer 515 may comprise a cyclic multiplexer operable to receive and combine the traffic in more than one wavelength through each port. In other example networks, multiplexer 512 may be a typical N×1 multiplexer operable to receive only the traffic in one wavelength through each port.

Filter 516 comprises any suitable filter operable to receive the traffic in $\lambda_1$-$\lambda_4$ from multiplexer 515 and pass the traffic in $\lambda_1$-$\lambda_4$ to filter 522. In the upstream direction, filter 516 is operable to receive traffic in $\lambda_u$ and direct traffic in $\lambda_u$ to receiver 518. Receiver 518 may comprise any suitable receiver operable to receive and process upstream traffic from ONUs 550 carried over time-shared $\lambda_u$.

Transmitter 520 comprises any suitable transmitter and is operable to transmit traffic over $\lambda_v$ for eventual broadcast to all ONUs 550. Transmitter 520 is further operable to direct the traffic to filter 522. In particular embodiments, transmitter 520 may transmit analog video traffic over $\lambda_v$. In alternative embodiments, transmitter 520 may transmit digital data traffic. It should be noted that, although a single transmitter 520 is illustrated, OLT 512 may comprise any suitable number of transmitters operable to transmit traffic for eventual broadcast to all ONUs 550.

Filter 522 is operable to receive the traffic in $\lambda_v$ and the traffic in $\lambda_1$-$\lambda_4$ and combine the traffic. Filter 522 is also operable to direct the combined traffic over fiber 530 to RN 540. In the upstream direction, filter 522 is operable to receive traffic in $\lambda_u$ and direct the traffic in $\lambda_u$ to filter 516.

Optical fiber 530 may comprise any suitable fiber to carry upstream and downstream traffic. In certain HPONs 500, optical fiber 530 may comprise, for example, bidirectional optical fiber. In other HPONs 500, optical fiber 530 may comprise two distinct fibers, one carrying downstream traffic and the other carrying upstream traffic.

RN 540 comprises filter 542, multiplexer 546, primary power splitter 548, and secondary power splitters 549. RN 540 is operable to receive the traffic in $\lambda_1$-$\lambda_4$ and $\lambda_v$ from OLT 512, filter out and broadcast the traffic in $\lambda_v$, and demultiplex and forward the traffic in $\lambda_1$-$\lambda_4$ to the ONUs in corresponding groups of wavelength-sharing ONUs 550. RN 540 is further operable to receive from ONUs 550 upstream signals carried over time-shared wavelength $\lambda_u$, combine these signals, and forward the combined traffic in $\lambda_u$ to OLT 512. It should be noted that although RN 540 is referred to as a remote node, "remote" refers to RN 540 being communicatively coupled to OLT 512 and ONUs 550 in any suitable spatial arrangement. A remote node may also generally be referred to as a distribution node.

Filter 542 may comprise any suitable filter operable to receive a signal comprising traffic in $\lambda_1$-$\lambda_4$ and $\lambda_v$, pass the traffic in $\lambda_1$-$\lambda_4$ to multiplexer 546, and direct the traffic in $\lambda_v$ to primary power splitter 548. Although filter 542 in the illustrated example includes only one filter, filter 542 may comprise any suitable number of filters (coupled to optional switches) to facilitate an upgrade of the network. In the upstream direction, filter 542 is operable to receive the traffic in $\lambda_u$, and direct it toward OLT 512.

Multiplexer 546 may comprise any suitable multiplexer/demultiplexer (and may be considered a wavelength router) and is operable to receive the signal comprising the traffic in $\lambda_1$-$\lambda_4$ and demultiplex the signal. Each output port of multiplexer 546 is operable to forward the traffic in a corresponding one of $\lambda_1$-$\lambda_4$ to a corresponding secondary power splitter 549. In the upstream direction, multiplexer 546 is operable to receive and terminate the traffic in $\lambda_u$, as ONUs 550 of example HPON 500 time-share $\lambda_u$ (and do not transmit traffic over multiple upstream wavelengths). Alternatively, multiplexer 546 may forward this traffic to filter 542 for suitable termination (where termination may be performed internally or externally).

It should be noted that multiplexer 546 may comprise a cyclic multiplexer or any other suitable type of multiplexer and may have any suitable number of ports. Also, although one multiplexer 546 is illustrated in remote node 540 of FIG. 2, in alternative remote nodes, multiplexer 546 may comprise two or more separate multiplexers receiving downstream signals from one or more upstream sources and forwarding the traffic downstream such that ONUs 550 share wavelengths. It should further be noted that the traffic in each wavelength may pass to a different secondary power splitter than that illustrated, the traffic in more than one wavelength may pass to a secondary power splitter, and/or multiplexer 546 may receive, multiplex, and pass traffic in less or more than four downstream wavelengths.

Primary power splitter 548 may comprise any suitable power splitter operable to receive the traffic in $\lambda_v$ and split the traffic into four copies. The power of each copy may be less than one-fourth of the power of the original signal $\lambda_v$. Primary power splitter 548 is operable to forward each copy to a corresponding secondary power splitter 549. In the upstream direction, primary power splitter 548 is operable to receive traffic transmitted by ONUs 550 over time-shared $\lambda_u$, from secondary power splitters 549 and combine this traffic into one signal. Primary power splitter 548 forwards the upstream signal to OLT 512. Primary power splitter 548 thus broadcasts the traffic in $\lambda_v$ in the downstream direction and combines traffic over time-shared $\lambda_u$ in the upstream direction. Although primary power splitter 548 is illustrated as a 1×4 power splitter, any suitable power splitter may be used.

Each secondary power splitter 549 may comprise any suitable power splitter, such as an optical coupler, operable to receive a signal from primary power splitter 548 and a signal from multiplexer 546, combine the two signals into one signal, split the combined signal into a suitable number of copies, and forward each copy to the ONUs in a corresponding wavelength-sharing group of ONUs 550 (each group of wavelength-sharing ONUs shares one of $\lambda_1$-$\lambda_4$ in the downstream direction). In the upstream direction, each secondary power splitter 549 is operable to receive traffic transmitted at $\lambda_u$ from each ONU 550 of a corresponding group of ONUs 550 and combine the traffic from each ONU 550 into one signal. Each secondary power splitter 549 is operable to split the combined upstream traffic into two copies and forward one copy to primary power splitter 548 and one copy to multiplexer 546. The copy forwarded to primary power splitter 548, as described above, is combined with other traffic from other ONUs 550 transmitted over time-shared $\lambda_u$. The copy forwarded to multiplexer 546 may be blocked or forwarded to filter 542 for suitable termination. Although secondary power splitters 549 are illustrated as 2×4 couplers in example HPON 500, secondary power splitters 549 may be any suitable coupler or combination of couplers (such as a 2×2 coupler coupled to two 1×2 couplers). Secondary power splitters 549 may split or combine any suitable number of signals.

Each ONU 550 (which may be an example of a downstream terminal) may comprise any suitable ONU or ONT. Each ONU 550 comprises a filter 560, receiver 562, filter 570, receiver 572, and transmitter 582. Each filter 560 may comprise any suitable filter operable to direct traffic in wavelength $\lambda_v$ (for example, analog video traffic) to receiver 562. Filter 560 is further operable to pass the traffic in the corresponding one of $\lambda_1$-$\lambda_4$ received at the ONU 550 to filter 570 and to pass the traffic in $\lambda_u$ to RN 540 in the upstream direction. Receiver 562 may comprise any suitable receiver operable to receive the traffic transmitted in $\lambda_v$ and process the traffic. Each filter 570 may comprise any suitable filter operable to receive the traffic in a corresponding one of $\lambda_1$-$\lambda_4$ and direct it to receiver 572. Filter 570 is further operable to pass the traffic in upstream wavelength $\lambda_u$ to corresponding filter 560 in the upstream direction. Receiver 572 may comprise any suitable receiver operable to receive the traffic transmitted in a corresponding one of $\lambda_1$-$\lambda 4$ and process the traffic. Receiver 572 may be operable to receive traffic in any one of $\lambda_1$-$\lambda_4$, providing flexibility in assigning (or re-assigning) an ONU 550 to a particular wavelength-sharing group. Each transmitter 582 may comprise any suitable transmitter operable to transmit traffic over $\lambda_u$ in the upstream direction, applying a suitable protocol to time-share $\lambda_u$ with the other ONUs 550.

It should be noted that although four ONUs 550 are illustrated as being part of a group of ONUs 550 in HPON 500, any suitable number of ONUs 550 may be part of a group sharing a downstream wavelength. In addition, there may be multiple groups each sharing a different downstream wavelength. For example, ONUs 550a may share $\lambda_1$, ONUs 550b (not illustrated) may share $\lambda_2$, ONUs 550c (not illustrated) may share $\lambda_3$, and ONUs 550d may share $\lambda_4$. Also, one or more ONUs 550 may be a part of more than one group in some networks. It should also be noted that any suitable number of ONUs 550 may be implemented in the network.

It should further be noted that ONUs 550 may be adjusted in an alternative upgrade to transmit traffic over multiple wavelengths (which may be combined by PS 548 of RN 540) to be received by receivers corresponding to transmitters 514 at OLT 512 (in which case filter 516 may or may not be taken out of the line). In an alternative upgrade, each group of ONUs 550 sharing a wavelength may transmit upstream traffic in a separate wavelength, multiplexer 546 may multiplex these wavelengths at RN 540, and receivers corresponding to transmitters 514 may receive the traffic in these wavelengths at OLT 512.

In operation, transmitters 514a-514d of OLT 512 transmit traffic at $\lambda_1$-$\lambda_4$, respectively, and forward the traffic to multiplexer 515. Multiplexer 515, which may include, for example, a cyclic multiplexer, combines the traffic in the four wavelengths into one signal and forwards the signal to filter 516. Filter 516 passes the downstream signal to filter 522. Transmitter 20 of OLT 512 also transmits traffic at $\lambda_v$ and forwards the traffic to filter 522. Filter 522 receives the traffic in $\lambda_1$-$\lambda_4$ and $\lambda_v$ and directs the traffic over optical fiber 530 to RN 540.

Filter 542 of RN 540 receives the signal and directs the traffic in (e.g., analog video) wavelength $\lambda_v$ to primary power splitter 548, allowing the traffic in $\lambda_1$-$\lambda_4$ to pass to multiplexer 546. Primary power splitter 548 receives the traffic in $\lambda_v$ and splits it into a suitable number of copies. In the illustrated embodiment, primary power splitter 548 splits the traffic in $\lambda_v$ into four copies, and forwards each copy to a corresponding secondary power splitter 549. Multiplexer 546 receives the signal comprising the traffic in $\lambda_1$-$\lambda_4$ and demultiplexes the signal into its constituent wavelengths. Multiplexer 546 then forwards the traffic in each wavelength along a corresponding fiber such that each secondary power splitter 549 receives the traffic in a corresponding one of $\lambda_1$-$\lambda_4$.

Each secondary power splitter 549 thus receives a copy of traffic in $\lambda_v$ from primary power splitter 548 and traffic in a corresponding one of $\lambda_1$-$\lambda_4$ from multiplexer 546, combines the traffic into one signal, and splits the signal into a suitable number of copies. In the illustrated embodiment, each secondary power splitter 549 splits the signal into four copies. In this way, the traffic (e.g., analog video) in wavelength $\lambda_v$ is broadcast to all ONUs 550 and a corresponding one of $\lambda_1$-$\lambda_4$ is transmitted to and shared by one or more groups of ONUs 550. In the illustrated embodiment, ONUs 550a share $\lambda_1$, ONUs 550b (not illustrated) share $\lambda_2$, ONUs 550c (not illustrated) share $\lambda_3$, and ONUs 550d share $\lambda_4$. It should be noted again that the groups of ONUs 550 sharing a wavelength may be different than those illustrated in FIG. 2, and groups of wavelength-sharing ONUs 550 may share more than one WDM wavelength in alternative networks.

After secondary power splitters 549 split the signal comprising the traffic in a corresponding one of $\lambda_1$-$\lambda_4$ and the traffic in $\lambda_v$ into four copies, secondary power splitters 549 forward each copy over fiber 530 such that the ONUs 550 coupled to the secondary power splitter 549 receive a copy. Filter 560 of each ONU 550 receives the signal and directs the traffic in $\lambda_v$ to receiver 562, which then processes the traffic carried over $\lambda_v$. Filter 560 passes the corresponding one of $\lambda_1$-$\lambda_4$ to filter 570. Filter 570 receives the traffic in the corresponding one of $\lambda_1$-$\lambda_4$ and directs the traffic to receiver 572 which then processes the traffic. Again, since each ONU 550 in a group may share one of $\lambda_1$-$\lambda_4$ with other ONUs 550 in the group, ONUs 550 may apply a suitable addressing protocol to process downstream traffic appropriately (e.g., to determine which portion of the traffic transmitted in the corresponding wavelength is destined for which ONU 550 in a group).

In the upstream direction, transmitter 582 of each ONU 550 transmits traffic over $\lambda_u$. Filters 570 and 560 receive the traffic in $\lambda_u$ and pass the traffic. The signal travels over fiber 530 to RN 540. Each secondary power splitter 549 of RN 540 receives traffic over time-shared $\lambda_u$ and combines the traffic from each ONU 550 in the corresponding group of ONUs 550. Again, since each ONU 550 transmits traffic over upstream wavelength $\lambda_u$, ONUs 550 may adhere to a suitable protocol to time-share $\lambda_u$ such that traffic from multiple ONUs 550 does not collide. After receiving and combining traffic over $\lambda_u$ into one signal, each secondary power splitter 549 splits the signal into two copies, forwarding one copy to multiplexer 546 and one copy to primary power splitter 548. As discussed above, multiplexer 546 of example network 500 may block $\lambda_u$ or forward $\lambda_u$ to filter 542 for suitable termination (internal or external to filter 542). Primary power splitter 548 receives traffic over $\lambda_u$ from each secondary power splitter 549, combines the traffic, and forwards the traffic to filter 542. Filter 542 receives the combined traffic in $\lambda_u$ and directs the traffic toward OLT 512. Fiber 530 carries the traffic in $\lambda_u$ to filter 522 of OLT 512. Filter 522 receives the traffic in $\lambda_u$ and passes the traffic to filter 516. Filter 516 receives the traffic in $\lambda_u$ and directs the traffic toward receiver 518. Receiver 518 receives the traffic and processes it.

Modifications, additions, or omissions may be made to the example HPON 500 described without departing from the scope of the invention. The components of the example HPON 500 described may be integrated or separated according to particular needs. Moreover, the operations of the example HPON 500 described may be performed by more, fewer, or other components. As examples only, alternative networks may comprise redundant lines from the OLT suitably coupled to the RN, the RN may provide any suitable number of outputs to the ONUs, and any suitable number of wavelength routers may be added to the RN (making suitable changes to the network).

Figure 3:
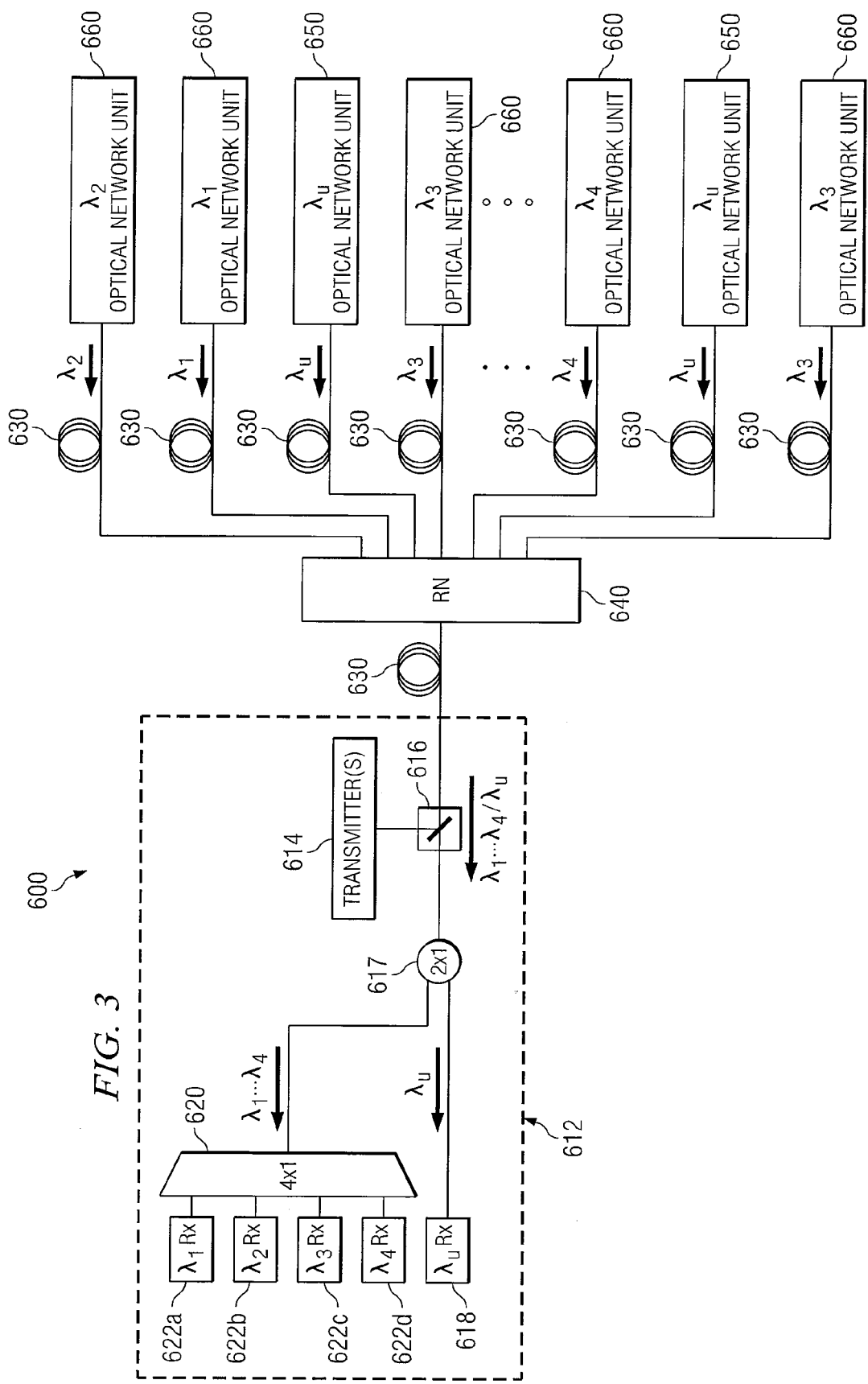
FIG. 3 is a diagram illustrating an example PON supporting two upstream transmission architectures according to a particular embodiment of the invention.

FIG. 3 is a diagram illustrating an example PON 600 supporting two upstream transmission architectures according to a particular embodiment of the invention. In particular embodiments, example PON 600 may support a legacy, upstream transmission architecture in which legacy ONUs 650 transmit at the legacy wavelength band(s) or channel(s). In addition, example PON 600 may support an upgraded, upstream transmission architecture in which each upgraded ONU 660 transmits at one of a new set of wavelength bands or channels, where one or more of the new set of wavelength bands or channels overlaps with one or more legacy wavelength band(s) or channel(s). In alternative embodiments, example PON 600 may be initially designed to support the two upstream transmission architectures and need not be the result of an upgrade. In either case, PON 600 supports the two different and possibly conflicting upstream transmission architectures by allocating different time-slots for upstream transmission to the two upstream transmission architectures. It should be noted that, in particular embodiments, non-overlapping wavelength bands in the two upstream transmission architectures may be operated continuously across time-slot boundaries if, for example, there is no chance for collisions in traffic to occur or if crosstalk between architectures is sufficiently low.

In particular embodiments, PON 600 may comprise an upgrade in upstream capacity to a PSPON or an HPON. For example, PON 600 may represent an upgrade to PSPON 10 of FIG. 1 or to HPON 500 of FIG. 2, described above, where the OLT and only certain ones of the ONUs of PSPON 10 or HPON 500 are upgraded. Thus, for example, ONUs 650 may continue to transmit at the time-shared $\lambda_u$ band or channel, and ONUs 660 may be upgraded ONUs transmitting at (possibly time-shared) WDM wavelength bands or channels, $\lambda_1$-$\lambda_4$, where one or more of $\lambda_1$-$\lambda_4$ overlaps with $\lambda_u$. Such overlap may cause the two upstream transmission architectures to be conflicting, as described further below.

It should be noted that, although one upstream wavelength, $\lambda_u$, is illustrated for the first transmission architecture and four upstream wavelengths, $\lambda_1$-$\lambda_4$, are illustrated for the second transmission architecture, each transmission architecture may transmit at any suitable number of upstream wavelengths. It should also be noted that $\lambda_1$-$\lambda_4$ of FIG. 3 may be different than $\lambda_1$-$\lambda_4$ of FIG. 2 in particular embodiments. In alternative embodiments, $\lambda_1$-$\lambda_4$ of FIG. 3 may be the same as $\lambda_1$-$\lambda_4$ of FIG. 2.

As an example only, in particular embodiments, ONUs 650 of PON 600 may comprise legacy GPON or HGPON ONUs that transmit at a $\lambda_u$ band or channel of 1310 nm+/−50 nm, adhering to the "GPON" ITU-T G.984 standard that allocates a one hundred nanometer band centered at 1310 nm for upstream transmission. Thus, provided that transmission remains within the one hundred nanometer band or channel, ONUs manufactured for such PONs need not be accurately centered to transmit at 1310 nm (e.g., they may transmit at a sub-band centered around 1320 nm) nor need they be precise in the wavelength band at which they transmit (e.g., they may transmit at a sub-band that drifts with temperature). ONUs 650 may thus transmit at any sub-band within the one hundred nanometer band or channel $\lambda_u$ specified by the G.984 standard in these particular embodiments. A legacy receiver 618 at OLT 612 may receive and process traffic in time-shared $\lambda_u$. These network components may comprise a first upstream transmission architecture.

In these example embodiments, each upgraded ONU 660 of PON 600 may transmit at one of $\lambda_1$-$\lambda_4$, and $\lambda_1$-$\lambda_4$ may comprise fixed, non-overlapping sub-bands of the one hundred nanometer band specified by the G.984 standard. Thus, each ONU 660 may accurately and precisely transmit at a particular fixed sub-band of the one hundred nanometer band. As an example only, each upgraded ONU 660 may transmit at one of four, twenty nanometer sub-bands centered around 1271 nm, 1291 nm, 1310 nm, and 1331 nm in particular embodiments. New receivers 622 at OLT 612 may receive and process traffic in (possibly time-shared) $\lambda_1$-$\lambda_4$. These network components may comprise a second upstream transmission architecture.

As can be observed in the example embodiments above, the legacy upstream transmission architecture and the upgraded upstream transmission architecture are conflicting. If ONUs 650 were to transmit at the same time as ONUs 660, collisions in traffic would occur. As described further below, PON 600 can support the two conflicting upstream transmission architectures by allocating different time-slots for upstream transmission to the two upstream transmission architectures. Thus, for example, particular time-slots may be allocated for upstream transmission at $\lambda_u$ by ONUs 650 and particular time-slots may be allocated for upstream transmission at one or more of $\lambda_1$-$\lambda_4$ by ONUs 660.

It should be noted that, in particular embodiments, ONUs 650 may time-share transmission at $\lambda_u$ in the particular time-slots allocated to ONUs 650, and ONUs 660 may time-share transmission at one or more of $\lambda_1$-$\lambda_4$ in the particular time-slots allocated to ONUs 660. In alternative embodiments, the number of upgraded ONUs 660 may correspond to the number of WDM wavelengths $\lambda_1$-$\lambda_4$ such that only a particular upgraded ONU 660 transmits at a particular one of $\lambda_1$-$\lambda_4$. It should further be noted that, although example PON 600 is described as being an upgrade in upstream bandwidth, example PON 600 may initially be designed to support the two upstream transmission architectures and need not be the result of an upgrade in particular embodiments. Also, although example PON 600 may be described as comprising a GPON or hybrid GPON (HGPON) for illustrative purposes, PON 600 may comprise any suitable PON, such as an APON or hybrid APON (HAPON), a BPON or hybrid BPON (HBPON), an EPON or hybrid EPON (HEPON), or a GEPON or hybrid GEPON (HGEPON).

Example PON 600 comprises OLT 612, fiber 630, RN 640, and a plurality of ONUs 650 and 660. OLT 612 comprises transmitter(s) 614, filter 616, splitter 617, receiver 618, demultiplexer 620, and receivers 622a-622d. Like the OLTs discussed above in conjunction with PSPON 10 and HPON 500, OLT 612 may be an example of an upstream terminal, may reside at a carrier's central office, and may be coupled to a larger communication network at the central office.

Transmitter(s) 614 comprise one or more transmitters operable to transmit downstream traffic. In a PSPON, transmitter(s) 614 may include any suitable PSPON transmitters such as, for example, the transmitters described above in conjunction with FIG. 1. In an HPON, transmitter(s) 614 may include any suitable HPON transmitters such as, for example, the transmitters described above in conjunction with FIG. 2. Depending on the PON and as described above, transmitter(s) 614 may transmit at broadcast wavelengths, shared wavelengths, and/or dedicated wavelengths. Filter 616 may comprise any suitable filter operable to direct upstream traffic in $\lambda_u$ or $\lambda_1$-$\lambda_4$ from ONUs 650 or ONUs 660, respectively, to splitter 617 and to direct downstream traffic (not illustrated) from transmitter(s) 614 to RN 640.

Splitter 617 may comprise any suitable splitter configured to couple receiver 618 and multiplexer 620 to the rest of PON 600. Splitter 618 is operable to receive upstream traffic in $\lambda_u$ or $\lambda_1$-$\lambda_4$ from ONUs 650 or ONUs 660, respectively, split the traffic into two copies, and forward one copy to receiver 618 and the other copy to multiplexer 618. For legacy ONU time-slots, an upstream component processing the traffic received by receiver 618 may process the received traffic, and upstream components processing the traffic received by receivers 622 may effectively ignore the received traffic. For upgraded ONU time-slots, the upstream component processing the traffic received by receiver 618 may effectively ignore the received traffic, and the upstream components processing the traffic received by receivers 622 may process the received traffic.

It should be noted that, in particular embodiments, an optical pre-amplifier may be inserted in the PON (e.g., at OLT 612) to amplify the upstream traffic. For example, an optical pre-amplifier may be inserted between filter 616 and splitter 617 in the illustrated embodiment. The pre-amplifier may be operable to compensate for the splitting loss incurred at splitter 618. The pre-amplifier may also be operable to maintain a particular upstream receiver sensitivity, such as, for example, by maintaining a sensitivity at receiver 618 similar to that of receiver 18 of FIG. 1. In particular embodiments, splitter 618 may comprise an asymmetric splitter designed to cause an imbalance in the power splitting ratio. The imbalance in the power splitting ratio may, in particular embodiments, be designed to result in equal receiver sensitivities being maintained for all upstream receivers.

In particular embodiments, splitter 617 may be replaced by a switch. In such embodiments, the switch may comprise any suitable component configured to selectively direct upstream traffic to either receiver 618 or multiplexer 620 based on the upstream transmission architecture that has been allocated a particular time-slot. For example, the switch may couple receiver 618 to the rest of PON 600 when receiving traffic in $\lambda_u$ and may couple multiplexer 620 to the rest of PON 600 when receiving traffic in $\lambda_1$-$\lambda_4$. The switch may be controlled to couple the appropriate upstream component at the appropriate time in any suitable manner, such as, for example, in a predetermined and fixed manner or in a dynamic manner.

Receiver 618 may comprise any suitable receiver configured to receive upstream traffic in a particular wavelength band and to process the traffic. For example, in the illustrated embodiment, receiver 618, which may be a legacy receiver, is configured to receive upstream traffic in time-shared $\lambda_u$ from legacy ONUs 650 and forward the traffic upstream for suitable processing. In particular embodiments, receiver 618 may be the same as receiver 18 of FIG. 1 or receiver 518 of FIG. 2.

Demultiplexer 620 may comprise any suitable demultiplexer configured to receive upstream traffic in a plurality of wavelengths, demultiplex the constituent wavelengths, and forward traffic in each wavelength to a corresponding receiver, one of 622a-622d. In the illustrated embodiment, demultiplexer 620 receives upstream traffic in $\lambda_1$-$\lambda_4$ from ONUs 660, demultiplexes the traffic into the four constituent wavelengths, and forwards the traffic in each wavelength to the appropriate receiver, one of 622a-622d. For example, the traffic in $\lambda_1$ is forwarded to receiver 622a, the traffic in $\lambda_2$ is forwarded to receiver 622b, the traffic in $\lambda_3$ is forwarded to receiver 622c, and the traffic in $\lambda_4$ is forwarded to 622d. As is illustrated, demultiplexer 620 may comprise a typical 1×N demultiplexer configured to forward only the traffic in one wavelength through each output port. In alternative embodiments, dumultiplexer 620 may comprise a cyclic demultiplexer.

Receivers 622a-622d may comprise any suitable receivers, each operable to receive upstream traffic in a particular wavelength and to process the traffic. In the illustrated embodiment, receivers 622a-622d receive and process traffic in $\lambda_1$-$\lambda_4$, respectively. In particular embodiments, $\lambda_1$-$\lambda_4$ may comprise sub-bands of $\lambda_u$, as described above.

It should be noted that receivers 622a-622b may be part of transceivers at OLT 612, and the corresponding transmitters may transmit, for example, WDM traffic downstream in an HPON (and thus demultiplexer 620 and receivers 622 may actually be integrated with transmitters 614). It should also be noted that $\lambda_1$-$\lambda_4$ in the upstream direction may or may not be the same as $\lambda_1$-$\lambda_4$ in the downstream direction (described above in conjunction with FIG. 2). It should further be noted that there may be any suitable number of upstream wavelengths in the upgraded transmission architecture (and not necessarily four), and a suitable number of corresponding receivers at OLT 612 may be used to receive traffic in those wavelengths.

Optical fiber 630 may comprise any suitable fiber to carry upstream and downstream traffic. In particular embodiments, optical fiber 630 may comprise, for example, bidirectional optical fiber. In alternative embodiments, optical fiber 630 may comprise two distinct fibers, one fiber carrying downstream traffic and the other fiber carrying upstream traffic.

RN 640 may comprise any suitable remote node in a PSPON, HPON, or other PON. In an upstream upgrade to a PSPON or an HPON, the RN of the PSPON or HPON being upgraded need not be modified in particular embodiments. In these embodiments, routing with regard to downstream traffic may, for example, not change. Also, routing with regard to upstream traffic may not change for legacy ONU time-slots (e.g., the RN's primary power splitter may continue to receive and combine traffic in time-shared $\lambda_u$). For upgraded ONU time-slots, routing with regard to upstream traffic may change, if at all, only with regard to, for example, the number and type of wavelengths being received and combined at the RN's primary power splitter (e.g., multiple, fixed sub-bands of $\lambda_u$ instead of $\lambda_u$ generally). In alternative embodiments, RN 640 may forward upstream traffic transmitted by ONUs 650 and ONUs 660 to OLT 612 in any other suitable manner.

In particular embodiments, RN 640 may comprise RN 40 described above in conjunction with FIG. 1. In alternative embodiments, RN 640 may comprise RN 540 described above in conjunction with FIG. 2. In either case, in particular embodiments, in a legacy ONU time-slot, the primary power splitter in RN 640 may receive the traffic in $\lambda_u$, combine the received traffic, and forward the traffic to OLT 612. In an upgraded ONU time-slot, the primary power splitter in RN 640 may receive the traffic in $\lambda_1$-$\lambda_4$, combine the received traffic, and forward the traffic to OLT 612. RN 640 may forward downstream traffic from OLT 612 to ONUs 640 and 660 in any suitable manner.

Each ONU 650 may comprise any suitable device operable to receive and process downstream traffic from OLT 612 in any suitable manner and transmit upstream traffic to OLT 612 according to a particular transmission architecture. In the illustrated embodiment, each ONU 650 time-shares transmission at $\lambda_u$ with other ONUs 650, where $\lambda_u$ may include the one hundred nanometer band specified by the G.984 standard. ONUs 650 time-share transmission at $\lambda_u$ only during those time-slots allocated to ONUs 650 for upstream transmission. During upgraded ONU time-slots, ONUs 650 may not transmit upstream traffic (to avoid collisions with traffic transmitted by upgraded ONUs 660). In particular embodiments, ONUs 650 may be the same as ONUs 50 and 550 described above, provided that they transmit only during legacy ONU time-slots. In particular embodiments, legacy ONU time-slots and upgraded ONU time-slots may be predetermined by OLT 612. In alternative embodiments, legacy ONU time-slots and upgraded ONU time-slots may be determined in any other suitable manner. It should be noted that any suitable number of ONUs 650 may be part of PON 600. In particular embodiments, ONUs 650 may be used by those users that do not desire an upgrade in upstream capacity.

Each ONU 660 may comprise any suitable device operable to receive and process downstream traffic from OLT 612 in any suitable manner and transmit upstream traffic to OLT 612 according to a different transmission architecture than that used by ONUs 650. In the illustrated embodiment, ONUs 660 transmit upstream traffic at $\lambda_1$-$\lambda_4$, which may, for example, comprise fixed, non-overlapping sub-bands of the one hundred nanometer band specified by the G.984 standard. In particular embodiments, those ONUs 660 transmitting at $\lambda_1$ may time-share transmission in that wavelength, those ONUs 660 transmitting at $\lambda_2$ may time-share transmission in that wavelength, those ONUs 660 transmitting at $\lambda_3$ may time-share transmission in that wavelength, and those ONUs 660 transmitting at $\lambda_4$ may time-share transmission in that wavelength. In alternative embodiments, a single ONU 660 may transmit at a particular one of $\lambda_1$-$\lambda_4$ (and these wavelengths need not be time-shared by ONUs 660). It should be noted that ONUs 660 may transmit at $\lambda_1$-$\lambda_4$ only during those time-slots allocated to ONUs 660 for upstream transmission. During legacy ONU time-slots, ONUs 660 may not transmit upstream traffic (to avoid collisions with traffic transmitted by legacy ONUs 650). Also, ONUs 660 may transmit at a fixed wavelength (one of $\lambda_1$-$\lambda_4$) in particular embodiments. In alternative embodiments, ONUs 660 may be tunable to transmit at a particular wavelength. It should further be noted that each ONU 650 or 660 may be placed in any suitable location in the network in particular embodiments (and not necessarily as illustrated in FIG. 3).

As can be observed, two upstream transmission architectures are supported in PON 600 by time-sharing transmission between the two. Network operators are thus provided with flexibility when upgrading capacity in a passive optical network. In particular embodiments, network operators may, for example, upgrade upstream capacity for some ONUs and maintain existing upstream capacity for other ONUs, even when the upgraded upstream transmission architecture would be conflicting with the existing upstream transmission architecture if used during the same time-slot. In addition, supporting the two different upstream transmission architectures may be relatively inexpensive. The only additional component (besides the upgraded ONUs 660, multiplexer 620, and receivers 622) to support the two architectures may be splitter (or switch) 617 in particular embodiments.

By providing flexibility when upgrading capacity in a passive optical network, particular embodiments allow network operators to more closely meet demand for greater bandwidth. For many network operators, closely meeting demand for greater bandwidth provides for an efficient upgrade path. That few and relatively inexpensive components may be used to support the transmission architectures also increases the attractiveness of particular embodiments. In addition, network operators may benefit from increased user satisfaction by allowing some users to upgrade to higher capacity while allowing other users to maintain existing capacity.

In operation, in either a PSPON or an HPON, downstream traffic may be transmitted as discussed above in conjunction with FIGS. 1 and 2. In particular embodiments, transmitter(s) 614 at OLT 612 may transmit traffic in broadcast wavelengths, shared wavelengths, and/or dedicated wavelengths, depending on the type of PON. Filter 616 may receive the transmitted downstream traffic and direct the traffic to RN 640 over optical fiber 630. RN 640 may distribute the downstream traffic in any suitable manner (depending on the type of PON) to each ONU 650 and 660. Each ONU 650 and 660 may receive the downstream traffic from RN 640 and process the traffic in any suitable manner.

In the upstream direction, in legacy ONU time-slots, ONUs 650 may time-share transmission at $\lambda_u$ according to any suitable protocol. In upgraded ONU time-slots, ONUs 660 may transmit at $\lambda_1$-$\lambda_4$, and, in particular embodiments, some ONUs 660 may time-share transmission at a particular one of these wavelengths (as is illustrated) using any suitable communication protocol to avoid collision of upstream traffic. The upstream traffic transmitted by ONUs 650 in legacy ONU time-slots and the traffic transmitted by ONUs 660 in upgraded ONU time-slots is forwarded to RN 640. For traffic transmitted by ONUs 650 during legacy ONU time-slots, RN 640 receives the upstream traffic, combines the received traffic, and forwards the combined traffic to OLT 612. For traffic transmitted by ONUs 660 during upgraded ONU time-slots, RN 640 receives the upstream traffic, combines the received traffic, and forwards the combined traffic to OLT 612.

At OLT 612, filter 616 receives the upstream traffic in $\lambda_u$ (for the legacy ONU time-slots) or the upstream traffic in $\lambda_1$-$\lambda_4$ (for the upgraded ONU time-slots) and directs this traffic to splitter 617. Splitter 618 receives the upstream traffic in $\lambda_u$ or $\lambda_1$-$\lambda_4$, splits the traffic into two copies, and forwards one copy to receiver 618 and the other copy to multiplexer 618. For legacy ONU time-slots, an upstream component processing the traffic received by receiver 618 processes the received traffic, and upstream components processing any traffic received by receivers 622 via multiplexer 618 may effectively ignore the received traffic. For upgraded ONU time-slots, the upstream component processing the traffic received by receiver 618 may effectively ignore the received traffic, and the upstream components processing the traffic received by receivers 622 via multiplexer 618 may process the received traffic. It should be noted that, in particular embodiments, coupler 617 may be replaced by a switch that, for legacy ONU time-slots, is selectively positioned to direct the upstream traffic in $\lambda_u$ to receiver 618 and, for upgraded ONU time-slots, is selectively positioned to direct the upstream traffic in $\lambda_1$-$\lambda_4$ to demultiplexer 620.

It should be noted that, although the two transmission architectures supported by PON 600 comprise a first transmission architecture transmitting traffic at $\lambda_u$ and a second transmission architecture transmitting traffic at $\lambda_1$-$\lambda_4$, any two, suitable transmission architectures may be supported by PON 600. For example, in particular embodiments, the first transmission architecture may transmit traffic at a greater number of wavelengths and the second transmission architecture may transmit traffic at a greater or less number of wavelengths. In addition or in the alternative, in particular embodiments, the first transmission architecture may transmit traffic at a different bit rate than the second transmission architecture. Transmission at different bit rates may require that the two transmission architectures time-share transmission in particular embodiments. It should further be noted that, although only two transmission architectures are supported by PON 600, more than two transmission architectures may be supported in alternative embodiments. Also, in particular embodiments, a transmitter may transmit traffic in the different transmission architectures where there is overlap between two bands in the different transmission architectures and the transmitter can be operated within the overlap. Alternatively, a transmitter may transmit traffic in the different transmission architectures by being tunable and reconfigurable to transmit in a particular band of each transmission architecture.

Modifications, additions, or omissions may be made to the example systems and methods described without departing from the scope of the invention. The components of the example methods and systems described may be integrated or separated according to particular needs. Moreover, the operations of the example methods and systems described may be performed by more, fewer, or other components.

Figure 4:
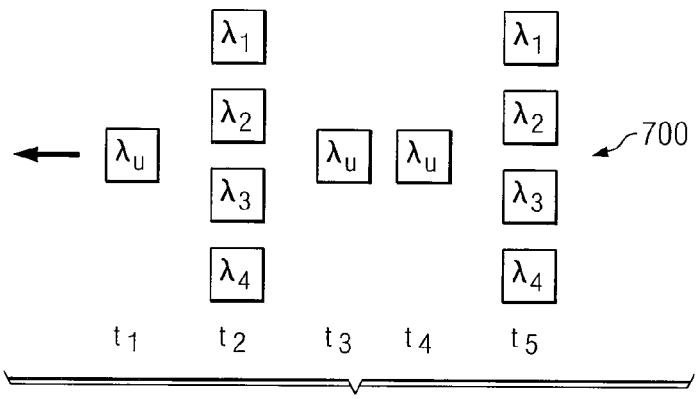
FIG. 4 is a diagram illustrating upstream transmission in example time-slots in the example PON of FIG. 3 according to a particular embodiment of the invention.

FIG. 4 is a diagram illustrating upstream transmission in example time-slots 700 in the example PON 600 of FIG. 3 according to a particular embodiment of the invention. In the first example time-slot, $t_1$, one of ONUs 650 transmits traffic at $\lambda_u$. The particular ONU 650 that transmits at $\lambda_u$ during time-slot $t_1$ may be pre-determined or determined dynamically according to any suitable protocol.

During time-slot $t_2$, one of ONUs 660 transmits traffic at $\lambda_1$, one of ONUs 660 transmits traffic at $\lambda_2$, one of ONUs 660 transmits traffic at $\lambda_3$, and one of ONUs 660 transmits traffic at $\lambda_4$. It should be noted that, in particular embodiments, particular ONUs 660 may time-share at least one of $\lambda_1$-$\lambda_4$ (as illustrated in FIG. 3 for $\lambda_3$), and the particular ONU 660 that transmits at the shared wavelength during time-slot $t_2$ may be pre-determined or determined dynamically according to any suitable protocol.

During time-slot $t_3$, one of ONUs 650 transmits traffic at $\lambda_u$. The particular ONU 650 that transmits at $\lambda_u$ during time-slot $t_3$ may be pre-determined or determined dynamically according to any suitable protocol. In particular circumstances, the ONU 650 transmitting at time-slot $t_3$ may be different than the ONU 650 transmitting at time-slot $t_1$. In other circumstances, the ONU 650 transmitting at time-slot $t_3$ may be the same as the ONU 650 transmitting at time-slot $t_1$.

During time-slot $t_4$, one of ONUs 650 transmits traffic at $\lambda_u$. The particular ONU 650 that transmits at $\lambda_u$ during time-slot $t_4$ may be pre-determined or determined dynamically according to any suitable protocol. In particular circumstances, the ONU 650 transmitting at time-slot $t_4$ may be different than the ONU 650 transmitting at time-slot $t_1$ and/or time-slot $t_3$. In other circumstances, the ONU 650 transmitting at time-slot $t_4$ may be the same as the ONU 650 transmitting at time-slot $t_1$ and/or time-slot $t_3$.

During time-slot $t_5$, one of ONUs 660 transmits traffic at $\lambda_1$, one of ONUs 660 transmits traffic at $\lambda_2$, one of ONUs 660 transmits traffic at $\lambda_3$, and one of ONUs 660 transmits traffic at $\lambda_4$. The particular ONU 660 that transmits at a shared wavelength (if any) during time-slot $t_5$ may be pre-determined or determined dynamically according to any suitable protocol (and may be different than or the same as the ONU 660 transmitting at the shared wavelength at time-slot $t_2$).

As illustrated in FIG. 4, two transmission architectures, one transmitting at $\lambda_u$ and the other transmitting at $\lambda_1$-$\lambda_4$, time-share upstream transmission. It should be noted that, although upstream transmission in a particular set of example time-slots 700 has been illustrated and described, traffic may be transmitted upstream in any suitable manner. For example, the sequence of time-slots may differ in different circumstances. Also, the length of the time-slots for a particular transmission architecture may be variable in particular embodiments. In addition, the length of the time-slots may differ between the two types of transmission architectures in particular embodiments. Also, upstream traffic need not be transmitted at all four wavelengths $\lambda_1$-$\lambda_4$ during each and every upgraded time-slot in particular embodiments.

It should also be noted that, although one upstream wavelength, $\lambda_u$, is illustrated for the first transmission architecture and four upstream wavelengths, $\lambda_1$-$\lambda_4$, are illustrated for the second transmission architecture, each transmission architecture may transmit at any suitable number of upstream wavelengths. It should also be noted that $\lambda_1$-$\lambda_4$ of FIG. 4 may be different than $\lambda_1$-$\lambda_4$ of FIG. 2 in particular embodiments. In alternative embodiments, $\lambda_1$-$\lambda_4$ of FIG. 4 may be the same as $\lambda_1$-$\lambda_4$ of FIG. 2.

Modifications, additions, or omissions may be made to the example systems and methods described without departing from the scope of the invention. The components of the example methods and systems described may be integrated or separated according to particular needs. Moreover, the operations of the example methods and systems described may be performed by more, fewer, or other components.

Figure 5:
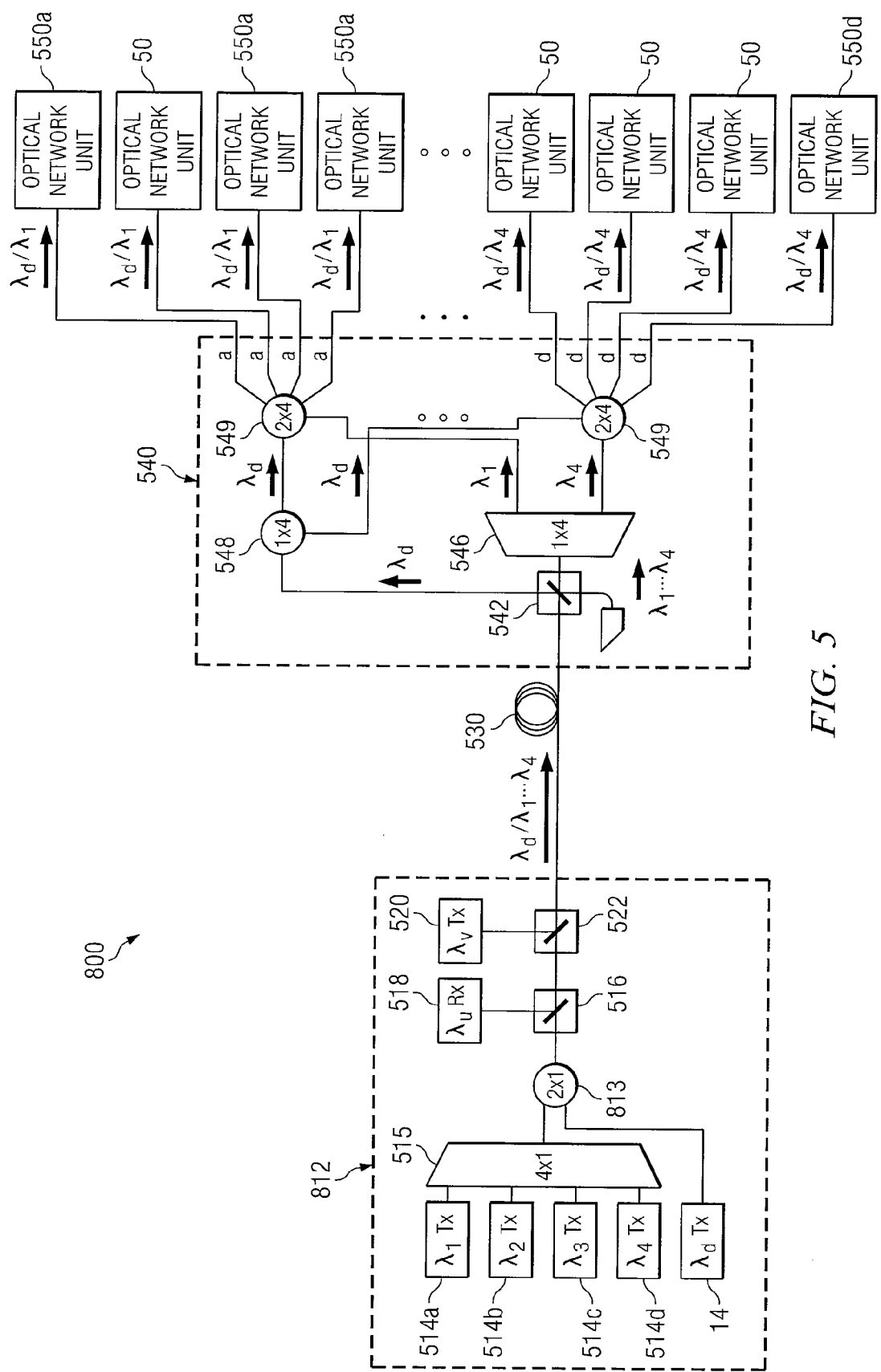
FIG. 5 is a diagram illustrating an example HPON supporting two downstream transmission architectures according to a particular embodiment of the invention.

FIG. 5 is a diagram illustrating an example HPON 800 supporting two downstream transmission architectures according to a particular embodiment of the invention. The first downstream transmission architecture may be, for example, the transmission architecture of PSPON 10 of FIG. 1 according to a particular embodiment. The second downstream transmission architecture may be, for example, the transmission architecture of HPON 500 of FIG. 2 according to a particular embodiment. In the transmission architecture of PSPON 10, downstream traffic is transmitted by transmitter 14 at $\lambda_d$, which is time-shared by ONUs 50 according to any suitable protocol. In the transmission architecture of HPON 500, downstream traffic is transmitted by transmitters 514a-514d at $\lambda_1$-$\lambda_4$, which are time-shared by sets of ONUs 550a-550d, respectively.

It should be noted that, although one downstream wavelength, $\lambda_d$, is illustrated for the first transmission architecture and four downstream wavelengths, $\lambda_1$-$\lambda_4$, are illustrated for the second transmission architecture, each transmission architecture may transmit at any suitable number of downstream wavelengths. It should also be noted that $\lambda_1$-$\lambda_4$ of FIG. 5 may be different than $\lambda_1$-$\lambda_4$ of FIGS. 2, 3, and/or 4 in particular embodiments. In alternative embodiments, $\lambda_1$-$\lambda_4$ of FIG. 5 may be the same as $\lambda_1$-$\lambda_4$ of one or more of FIGS. 2, 3, and 4.

The two downstream transmission architectures of FIG. 5 may be conflicting in particular embodiments. For example, in particular embodiments, $\lambda_d$ and $\lambda_1$-$\lambda_4$ may at least partially overlap, and thus may not be transmitted at the same time due to possible traffic collisions. In alternative embodiments, $\lambda_d$ and $\lambda_1$-$\lambda_4$ may not overlap and thus may be transmitted at the same time without causing collisions in traffic; however, transmitting $\lambda_d$ and $\lambda_1$-$\lambda_4$ at the same time may nonetheless cause ineffective communication of traffic. For example, if an ONU has a single receiver receiving traffic in $\lambda_d$ and $\lambda_1$-$\lambda_4$ and no blocking filter to filter out the traffic that does not correspond to the ONU, then the ONU would not process the traffic in its corresponding wavelength correctly if it received traffic in $\lambda_d$ and one of $\lambda_1$-$\lambda_4$ at the same time (the traffic would be garbled).

To support the two conflicting downstream architectures, HPON 800 time-shares transmission between the two downstream architectures. The downstream architecture of PSPON 10 transmits at particular time-slots, and the downstream architecture of HPON 500 transmits at other particular time-slots. By time-sharing downstream transmission, HPON 800 allows the two downstream transmission architectures to effectively communicate traffic to downstream ONUs 50 and 550.

HPON 800 comprises OLT 812, optical fiber 530, RN 540, ONUs 50, and ONUs 550a-550d. OLT 812 comprises transmitters 14 and 514a-514d, multiplexer 515, coupler 813, filter 516, receiver 518, transmitter 520, and filter 522. Transmitters 14 and 514a-514d, multiplexer 515, filter 516, receiver 518, transmitter 520, and filter 522 have been described above in conjunction with FIGS. 1 and 2 and thus will not be described again in detail. It should be noted that transmitting at $\lambda_d$ and $\lambda_1$-$\lambda_4$ may be conflicting for any suitable reason, such as, for example, because $\lambda_d$ and $\lambda_1$-$\lambda_4$ at least partially overlap and/or because traffic in $\lambda_d$ and $\lambda_1$-$\lambda_4$ cannot be processed correctly at the same time by components of HPON 800, such as, for example, ONUs 50 and/or ONUs 550.

Coupler 813 may comprise any suitable coupler configured to couple transmitter 14 and multiplexer 515 to the rest of PON 800. Coupler 813 is operable to receive downstream traffic in $\lambda_d$ from transmitter 14 during legacy time-slots and forward the received traffic to filter 516. Coupler 813 is further operable to receive downstream traffic in $\lambda_1$-$\lambda_4$ from transmitters 514 (via multiplexer 515) during upgraded time-slots and forward the received traffic to filter 516. It should be noted that, in particular embodiments, coupler 813 may comprise an asymmetric coupler, where the power loss is greater for one input signal than for the other. The determination about what input signal should have greater power loss may be made in any suitable manner. Also, in particular embodiments, coupler 813 may be replaced by a filter. Optical fiber 530, RN 540, ONUs 50, and ONUs 550a-550d have been described above in conjunction with FIGS. 1 and 2 and thus will not be described again in detail.

It should be noted that traffic in $\lambda_d$ may be directed to primary power splitter 548 by filter 542 of RN 540 in order for primary power splitter 548 to broadcast the traffic in $\lambda_d$ to ONUs 50 and ONUs 550a-550d. In particular embodiments, traffic in $\lambda_d$ may be time-shared only by ONUs 50. In alternative embodiments, traffic in $\lambda_d$ may be time-shared by ONUs 50 and one or more ONUs 550.

It should also be noted that traffic in $\lambda_1$ is directed to the ONUs 50 and/or 550a coupled to fiber branches "a," traffic in $\lambda_2$ is directed to the ONUs 50 and/or 550b coupled to fiber branches "b" (not illustrated), traffic in $\lambda_3$ is directed to the ONUs 50 and/or 550c coupled to fiber branches "c" (not illustrated), and traffic in $\lambda_4$ is directed to the ONUs 50 and/or 550d coupled to fiber branches "d." In particular embodiments, traffic in $\lambda_1$-$\lambda_4$ may be time-shared only by ONUs 550a-550d, respectively.

In operation, in the downstream direction, in legacy ONU time-slots, transmitter 14 transmits traffic at $\lambda_d$, and coupler 813 receives the traffic and forwards the traffic to filter 516. In upgraded ONU time-slots, transmitters 514a-514d transmit traffic at $\lambda_1$-$\lambda_4$, respectively, multiplexer 515 combines the traffic in $\lambda_1$-$\lambda_4$, and coupler 813 receives the traffic and forwards the traffic to filter 516. Filter 516 directs the traffic in either $\lambda_d$ or $\lambda_1$-$\lambda_4$ to filter 522. Filter 522 directs the traffic in either $\lambda_d$ or $\lambda_1$-$\lambda_4$ to RN 540 over fiber 530. In particular embodiments, traffic may also be transmitted at $\lambda_v$ by transmitter 520 and this traffic may be combined with the other downstream traffic by filter 522 and forwarded to RN 540 over fiber 530 for broadcast to ONUs 50 and 550.

At RN 540, the traffic in $\lambda_d$ (if the time-slot corresponds to a legacy ONU time-slot) or the traffic in $\lambda_1$-$\lambda_4$ (if the time-slot corresponds to an upgraded ONU time-slot) is received by filter 542. The traffic in $\lambda_d$ is directed by filter 542 to primary power splitter 548 for broadcast. The traffic in $\lambda_1$-$\lambda_4$ is directed by filter 542 to demultiplexer 546 for proper routing.

At primary power splitter 548, the traffic in $\lambda_d$ is split into a suitable number of copies, and each copy is forwarded to a corresponding secondary power splitter 549. Each copy is further split into a suitable number of copies at each secondary power splitter 549 and forwarded to a corresponding set of ONUs 50 and/or 550. Although all ONUs 50 and 550 may receive the traffic in $\lambda_d$, in particular embodiments, only ONUs 50 (and not ONUs 550) may time-share $\lambda_d$. In alternative embodiments, ONUs 50 and one or more ONUs 550 may time-share $\lambda_d$. In particular embodiments, those ONUs 550 for which traffic in $\lambda_d$ is not intended may block $\lambda_d$ using a filter or in any other suitable manner. An ONU 50 or 550 receiving traffic in $\lambda_d$ may identify the traffic in $\lambda_d$ intended for it in any suitable manner, such as, for example by reading an identifier carried by the traffic. If the traffic is intended for the ONU, the ONU may process the traffic. If the traffic is not intended for the ONU, the ONU may effectively ignore the traffic.

At demultiplexer 546, $\lambda_1$-$\lambda_4$ are separated, and the traffic in $\lambda_1$-$\lambda_4$ is forwarded to a corresponding secondary power splitter 549. Each secondary power splitter 549 receives the traffic in a corresponding one of $\lambda_1$-$\lambda_4$, splits the traffic into a suitable number of copies, and forwards each copy to a corresponding set of ONUs. Each set of ONUs may comprise one or more ONUs 50 and/or one or more ONUs 550. Thus, the traffic in $\lambda_1$ is forwarded along fiber branches "a" to ONUs 550a and ONU 50. The traffic in $\lambda_2$ is forwarded along fiber branches "b" (not illustrated) to ONU(s) 550b and possibly ONU(s) 50 (not illustrated). The traffic in $\lambda_3$ is forwarded along fiber branches "c" (not illustrated) to ONU(s) 550c and possibly ONU(s) 50 (not illustrated). The traffic in $\lambda_4$ is forwarded along fiber branches "d" to ONU 550d and ONUs 50. In particular embodiments, $\lambda_1$-$\lambda_4$ are shared only by sets of ONUs 550a-550d, respectively, and not by any ONUs 50. In particular embodiments, two or more ONUs 550 may time-share a corresponding one of $\lambda_1$-$\lambda_4$, such as, for example, ONUs 550a in the illustrated embodiment. In alternative embodiments, a single ONU 550 may receive traffic in a particular one of $\lambda_1$-$\lambda_4$, such as, for example, ONU 550d in the illustrated embodiment.

In particular embodiments, those ONUs 50 for which traffic in a corresponding one of $\lambda_1$-$\lambda_4$ is not intended may block the corresponding one of $\lambda_1$-$\lambda_4$ using a filter or in any other suitable manner. An ONU 50 or 550 receiving traffic in a corresponding one of $\lambda_1$-$\lambda_4$ may identify the traffic in $\lambda_1$-$\lambda_4$ intended for it in any suitable manner, such as, for example by reading an identifier carried by the traffic. If the traffic is intended for the ONU, the ONU may process the traffic. If the traffic is not intended for the ONU, the ONU may effectively ignore the traffic.

In the upstream direction, traffic is transmitted in any suitable manner. For example, in particular embodiments, upstream traffic may be transmitted at time-shared $\lambda_u$ and/or at $\lambda_1$-$\lambda_4$ as described above in conjunction with FIG. 1, 2, or 3, or in any other suitable manner. It should again be noted that $\lambda_1$-$\lambda_4$ in the downstream direction may be different than $\lambda_1$-$\lambda_4$ in the upstream direction in particular embodiments. In alternative embodiments, $\lambda_1$-$\lambda_4$ in the downstream direction may be the same as $\lambda_1$-$\lambda_4$ in the upstream direction.

It should also be noted that, although the two transmission architectures supported by HPON 800 comprise a first transmission architecture transmitting downstream traffic at $\lambda_d$ and a second transmission architecture transmitting downstream traffic at $\lambda_1$-$\lambda_4$, any two, suitable transmission architectures may be supported by HPON 800. For example, in particular embodiments, the first transmission architecture may transmit traffic at a greater number of wavelengths and the second transmission architecture may transmit traffic at a greater or less number of wavelengths. In addition or in the alternative, in particular embodiments, the first transmission architecture may transmit traffic at a different bit rate than the second transmission architecture. Transmission at different bit rates may require that the two transmission architectures time-share transmission in particular embodiments. It should also be noted that in particular embodiments, HPON 800 may be modified to provide the functionality of PON 600 in any suitable manner. It should further be noted that more than two downstream transmission architectures may be supported in particular embodiments. Also, in particular embodiments, a transmitter may transmit traffic in the different transmission architectures where there is overlap between two bands in the different transmission architectures and the transmitter can be operated within the overlap. Alternatively, a transmitter may transmit traffic in the different transmission architectures by being tunable and reconfigurable to transmit in a particular band of each transmission architecture.

Modifications, additions, or omissions may be made to the example systems and methods described without departing from the scope of the invention. The components of the example methods and systems described may be integrated or separated according to particular needs. Moreover, the operations of the example methods and systems described may be performed by more, fewer, or other components.

Figure 6:
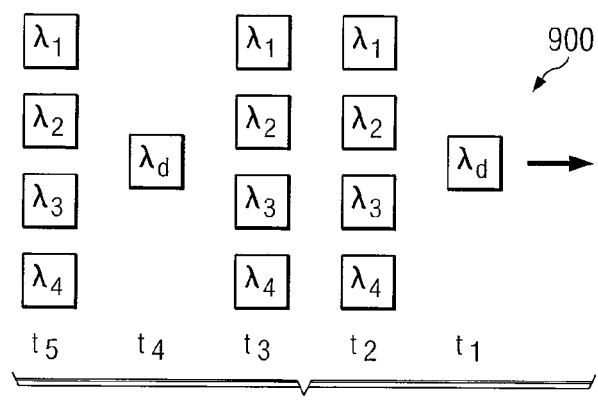
FIG. 6 is a diagram illustrating downstream transmission in example time-slots in the example HPON of FIG. 5 according to a particular embodiment of the invention.

FIG. 6 is a diagram illustrating downstream transmission in example time-slots 900 in the example HPON 800 of FIG. 5 according to a particular embodiment of the invention. In the first example time-slot, $t_1$, OLT 812 transmits traffic at $\lambda_d$ for broadcast to ONUs 50 and 550. In particular embodiments, the traffic in $\lambda_d$ at time-slot $t_1$ may be intended for a particular ONU 50, and ONUs 50 may be time-sharing $\lambda_d$.

During time-slot $t_2$, OLT 812 transmits traffic at $\lambda_1$-$\lambda_4$ for routing to ONUs 550a-550d, respectively (and particular ones of ONUs 50 in particular embodiments). In particular embodiments, the traffic in $\lambda_2$ at time-slot $t_2$ may be intended for a particular ONU 550a, the traffic in $\lambda_2$ at time-slot $t_2$ may be intended for a particular ONU 550b, the traffic in $\lambda_3$ at time-slot $t_2$ may be intended for a particular ONU 550c, and the traffic in $\lambda_4$ at time-slot $t_2$ may be intended for a particular ONU 550d. In particular embodiments, a plurality of ONUs 550a may share $\lambda_1$ (as illustrated in FIG. 5) a plurality of ONUs 550b may share $\lambda_2$, a plurality of ONUs 550c may share $\lambda_3$, and/or a plurality of ONUs 550d may share $\lambda_4$. In alternative embodiments, a single ONU 550a may receive traffic in $\lambda_1$, a single ONU 550b may receive traffic in $\lambda_2$, a single ONU 550c may receive traffic in $\lambda_3$, and/or a single ONU 550d may receive traffic in $\lambda_4$ (as illustrated in FIG. 5).

During time-slot $t_3$, OLT 812 transmits traffic at $\lambda_1$-$\lambda_4$ for routing to ONUs 550a-550d, respectively (and particular ones of ONUs 50 in particular embodiments). In particular embodiments, the traffic in $\lambda_1$ at time-slot $t_3$ may be intended for a particular ONU 550a, the traffic in $\lambda_2$ at time-slot $t_3$ may be intended for a particular ONU 550b, the traffic in $\lambda_3$ at time-slot $t_3$ may be intended for a particular ONU 550c, and the traffic in $\lambda_4$ at time-slot $t_3$ may be intended for a particular ONU 550d. In particular embodiments, one or more of these ONUs 550 may be different than the ONUs 550 for which the traffic transmitted at time-slot $t_2$ is intended. In alternative embodiments, one or more of these ONUs 550 may be the same as those ONUs 550 for which the traffic transmitted at time-slot $t_2$ is intended.

During time-slot $t_4$, OLT 812 transmits traffic at $\lambda_d$ for broadcast to ONUs 50 and 550. In particular embodiments, the traffic in $\lambda_d$ at time-slot $t_4$ may be intended for a particular ONU 50, and, as discussed above, ONUs 50 may be time-sharing $\lambda_d$. In particular embodiments, the ONU 50 receiving traffic transmitted at time-slot $t_4$ in $\lambda_d$ may be different than the ONU 50 receiving traffic transmitted at time-slot $t_1$ in $\lambda_d$. In alternative embodiments, the ONU 50 receiving traffic transmitted at time-slot $t_4$ in $\lambda_d$ may be the same ONU 50 receiving traffic transmitted at time-slot $t_1$ in $\lambda_d$.

During time-slot $t_5$, OLT 812 transmits traffic at $\lambda_1$-$\lambda_4$ for routing to ONUs 550a-550d, respectively (and particular ones of ONUs 50 in particular embodiments). In particular embodiments, the traffic in $\lambda_2$ at time-slot $t_5$ may be intended for a particular ONU 550a, the traffic in $\lambda_2$ at time-slot $t_5$ may be intended for a particular ONU 550b, the traffic in $\lambda_3$ at time-slot $t_5$ may be intended for a particular ONU 550c, and the traffic in $\lambda_4$ at time-slot $t_5$ may be intended for a particular ONU 550d. In particular embodiments, one or more of these ONUs 550 may be different than those ONUs 550 for which the traffic transmitted at time-slot $t_2$ and/or $t_3$ is intended. In alternative embodiments, one or more of these ONUs 550 may be the same as those ONUs 550 for which the traffic transmitted at time-slot $t_2$ and/or $t_3$ is intended.

It should be noted that, although downstream transmission in a particular set of example time-slots 900 has been illustrated and described, traffic may be transmitted downstream in any suitable manner. For example, the sequence of time-slots may differ in different circumstances. Also, the length of the time-slots for a particular transmission architecture may be variable in particular embodiments. In addition, the length of the time-slots may differ between the two types of transmission architectures in particular embodiments. In addition, downstream traffic need not be transmitted at all four wavelengths $\lambda_1$-$\lambda_4$ during each and every upgraded time-slot in particular embodiments. Also, the sequence of time-slots may be selected by OLT 812 in any suitable manner, such as, for example, in a pre-determined and fixed manner or a dynamically variable manner.

It should be noted that, although one downstream wavelength, $\lambda_d$, is illustrated for the first transmission architecture and four downstream wavelengths, $\lambda_1$-$\lambda_4$, are illustrated for the second transmission architecture, each transmission architecture may transmit at any suitable number of downstream wavelengths. It should also be noted that $\lambda_1$-$\lambda_4$ of FIG. 6 may be different than $\lambda_1$-$\lambda_4$ of FIGS. 2, 3, and/or 4 in particular embodiments. In alternative embodiments, $\lambda_1$-$\lambda_4$ of FIG. 6 may be the same as $\lambda_1$-$\lambda_4$ of one or more of FIGS. 2, 3, and 4.

Modifications, additions, or omissions may be made to the example systems and methods described without departing from the scope of the invention. The components of the example methods and systems described may be integrated or separated according to particular needs. Moreover, the operations of the example methods and systems described may be performed by more, fewer, or other components.

Although the present invention has been described with several embodiments, various changes and modifications may be suggested to one skilled in the art. It is intended that the present invention encompass such changes and modifications as fall within the scope of the appended claims.

What is claimed is:

1. A method for managing different transmission architectures in a passive optical network (PON), comprising:
    transmitting traffic in an upstream or downstream direction in a first time-slot from a first set of one or more transmitters in a PON at each channel of a first set of one or more channels, wherein each channel in the first set of channels has a separate wavelength band from any other channels in the first set of channels; and
    transmitting traffic in the same upstream or downstream direction in a second time-slot from a second set of one or more transmitters in the PON at each channel of a second set of one or more channels that collectively provide greater bandwidth than the first set of one or more channels, wherein each channel in the second set of channels has a separate wavelength band from any other channels in the second set of channels and wherein the wavelength band of at least one channel of the first set at least partially overlaps the wavelength band of at least one channel of the second set but is not identical to the wavelength band of the at least one channel of the second set, where channels are at least partially overlapping if traffic cannot be sent in the at least partially overlapping channels at the same time without causing collisions of traffic.

2. The method of claim 1, wherein the number of channels in the first set is different than the number of channels in the second set.

3. The method of claim 2, wherein:
    the first set of channels comprises a single channel; and
    the second set of channels comprises a plurality of sub-bands of a wavelength band of the single channel.

4. The method of claim 1, wherein:
    at least some of the traffic transmitted in the first time-slot is further transmitted at a first bit rate;
    at least some of the traffic transmitted in the second time-slot is further transmitted at a second bit rate; and
    the first bit rate is different than the second bit rate.

5. The method of claim 1, wherein the traffic is transmitted in the upstream direction.

6. The method of claim 5, wherein the traffic in the first set of one or more channels is received at a first set of one or more corresponding receivers at a receiving terminal in the PON and the traffic in the second set of one or more channels is received at a second set of one or more corresponding receivers at the receiving terminal.

7. The method of claim 1, wherein the traffic is transmitted in the downstream direction.

8. The method of claim 7, wherein the traffic in the first set of one or more channels and the traffic in the second set of one or more channels is received at a single receiver at at least one receiving terminal in the PON.

9. A system for managing different transmission architectures in a passive optical network (PON), comprising:
    a first set of one or more transmitters configured to transmit traffic in an upstream or downstream direction in a first time-slot in a PON at each channel of a first set of one or more channels, wherein each channel in the first set of channels has a separate wavelength band from any other channels in the first set of channels; and
    a second set of one or more transmitters configured to transmit traffic in the same upstream or downstream direction in a second time-slot in the PON at each channel of a second set of one or more channels that collectively provide greater bandwidth than the first set of one or more channels, wherein each channel in the second set of channels has a separate wavelength band from any other channels in the second set of channels and wherein the wavelength band of at least one channel of the first set at least partially overlaps the wavelength band of at least one channel of the second set but is not identical to the wavelength band of the at least one channel of the second set, where channels are at least partially overlapping if traffic cannot be sent in the at least partially overlapping channels at the same time without causing collisions of traffic.

10. The system of claim 9, wherein a transmitter is comprised in the first set of transmitters and in the second set of transmitters and is configured to transmit traffic in a channel in the first time-slot and in a channel in the second time-slot.

11. The system of claim 9, wherein the number of channels in the first set is different than the number of channels in the second set.

12. The system of claim 11, wherein:
    the first set of channels comprises a single channel; and
    the second set of channels comprises a plurality of sub-bands of a wavelength band of the single channel.

13. The system of claim 9, wherein:
    the first set of one or more transmitters is further configured to transmit at least some of the traffic in the first time-slot at a first bit rate;

the second set of one or more transmitters is further configured to transmit at least some of the traffic in the second time-slot at a second bit rate; and
the first bit rate is different than the second bit rate.

14. The system of claim 9, wherein the first set of one or more transmitters and the second set of one or more transmitters are configured to transmit traffic in the upstream direction.

15. The system of claim 14, further comprising:
a first set of one or more receivers at a receiving terminal in the PON and configured to receive the traffic in the first set of one or more channels; and
a second set of one or more receivers at the receiving terminal and configured to receive the traffic in the second set of one or more channels.

16. The system of claim 15, further comprising a splitter at the receiving terminal and configured to:
receive the traffic in the first set of one or more channels and the traffic in the second set of one or more channels;
split the received traffic into a first copy and a second copy; and
forward a first copy of the received traffic to the first set of one or more receivers and a second copy of the received traffic to the second set of one or more receivers.

17. The system of claim 15, further comprising a switch at the receiving terminal and configured to:
receive the traffic in the first set of one or more channels and the traffic in the second set of one or more channels; and
selectively forward the traffic in the first set of one or more channels to the first set of one or more receivers and the traffic in the second set of one or more channels to the second set of one or more receivers.

18. The system of claim 9, wherein the first set of one or more transmitters and the second set of one or more transmitters are configured to transmit traffic in the downstream direction.

19. The system of claim 18, further comprising a single receiver at at least one receiving terminal in the PON and configured to receive the traffic in the first set of one or more channels and the traffic in the second set of one or more channels.

20. A method for managing different transmission architectures in a passive optical network (PON), comprising:
transmitting traffic in an upstream direction in a first time-slot from a first set of one or more transmitters in a PON at each channel of a first set of one or more channels, wherein each channel in the first set of channels has a separate wavelength band from any other channels in the first set of channels; and
transmitting traffic in the upstream direction in a second time-slot from a second set of one or more transmitters in the PON at each channel of a second set of one or more channels that collectively provide greater bandwidth than the first set of one or more channels, wherein each channel in the second set of channels has a separate wavelength band from any other channels in the second set of channels and wherein:
the wavelength band of at least one channel of the first set at least partially overlaps the wavelength band of at least one channel of the second set but is not identical to the wavelength band of the at least one channel of the second set, where channels are at least partially overlapping if traffic cannot be sent in the at least partially overlapping channels at the same time without causing collisions of traffic;
at least some of the traffic transmitted in the first time-slot is further transmitted at a first bit rate;
at least some of the traffic transmitted in the second time-slot is further transmitted at a second bit rate; and
the first bit rate is different than the second bit rate.

\* \* \* \* \*